United States Patent
Sasaki et al.

(10) Patent No.: US 7,720,309 B2
(45) Date of Patent: May 18, 2010

(54) IMAGE PROCESSOR AND CAMERA SYSTEM, IMAGE PROCESSING METHOD, AND MOTION PICTURE DISPLAYING METHOD

(75) Inventors: Gen Sasaki, Osaka (JP); Yusuke Nara, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 782 days.

(21) Appl. No.: 11/613,502

(22) Filed: Dec. 20, 2006

(65) Prior Publication Data

US 2007/0147706 A1    Jun. 28, 2007

(30) Foreign Application Priority Data

Dec. 27, 2005    (JP)    ................. 2005-374895

(51) Int. Cl.
*G06K 9/32* (2006.01)
(52) U.S. Cl. .................. 382/295; 382/209; 382/219
(58) Field of Classification Search ............... 382/209, 382/218, 219
See application file for complete search history.

(56) References Cited

U.S. PATENT DOCUMENTS 6,801,248 B1 *  10/2004  Horiuchi ................ 348/208.13
7,271,937 B2 *   9/2007  Schrey et al. ............... 358/474

FOREIGN PATENT DOCUMENTS

| JP | 2006-58945   | 3/2006 |
| JP | 2006-148496  | 6/2006 |
| JP | 2006-186481  | 7/2006 |
| JP | 2007-110528  | 4/2007 |

* cited by examiner

*Primary Examiner*—Yosef Kassa
(74) *Attorney, Agent, or Firm*—Oblon, Spivak, McClelland, Maier & Neustadt, L.L.P.

(57) ABSTRACT

A similar-image detecting part detects similar image regions similar to one another in a plurality of frame images captured by rolling shutter type exposure. A displacement-vector detecting part detects a displacement vector of each of the similar image regions with respect to a reference position in each of the plurality of frame images. An average calculating part calculates an average of displacement vectors in the plurality of frame images. A correcting part shifts a similar image region in one of the plurality of frame images such that the displacement vector of the similar image region becomes the average calculated by the average calculating part.

10 Claims, 25 Drawing Sheets

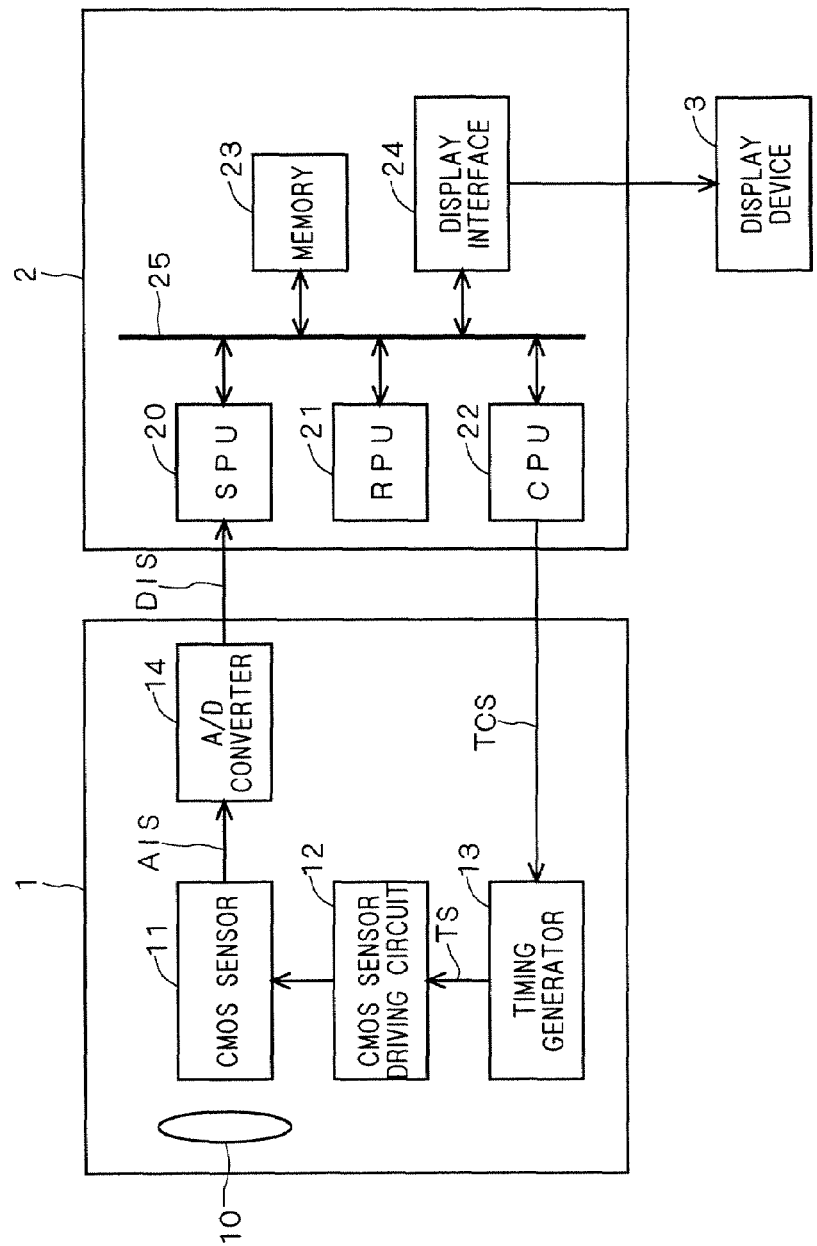

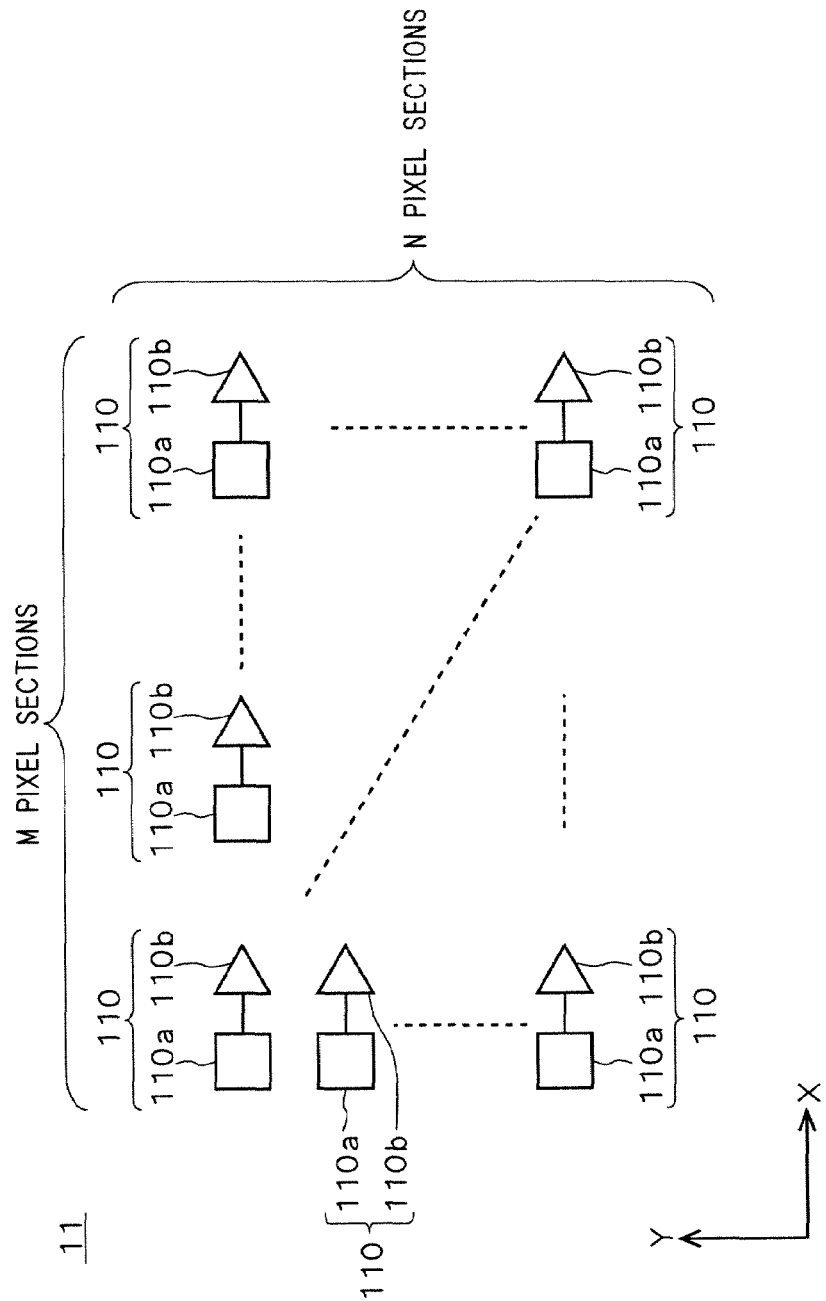

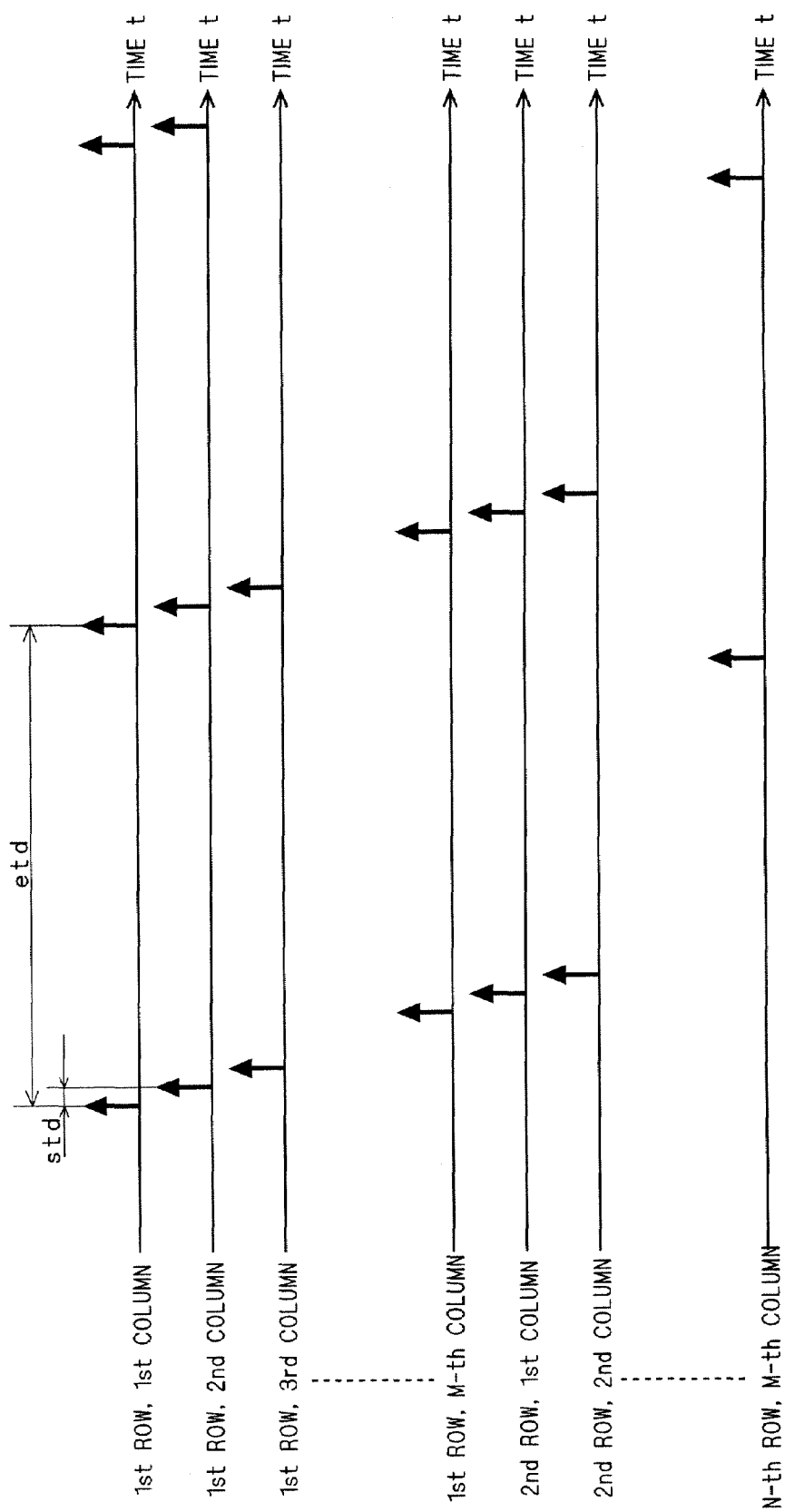

FR1

FR2

FR3

FR4

F I G . 2 1
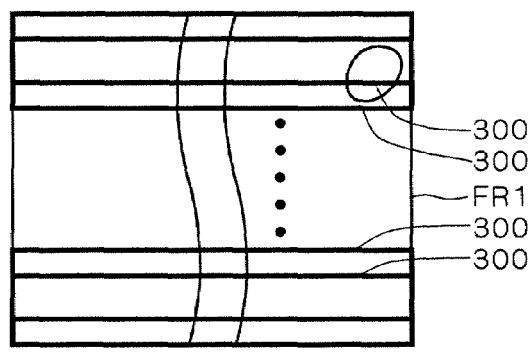
F I G . 2 2
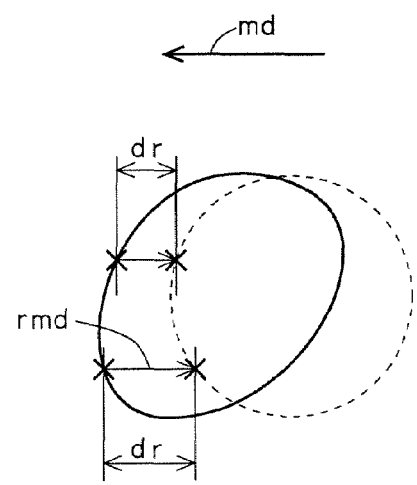
F I G . 2 3
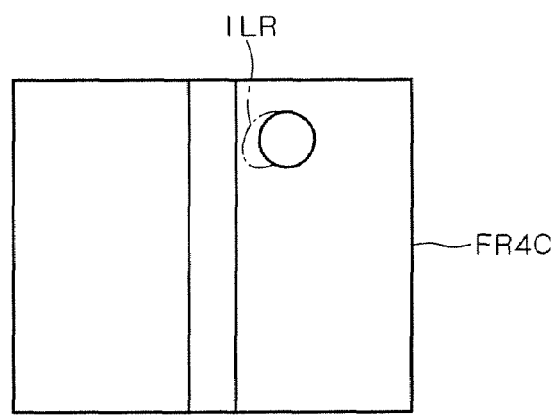

F I G . 3 0 A
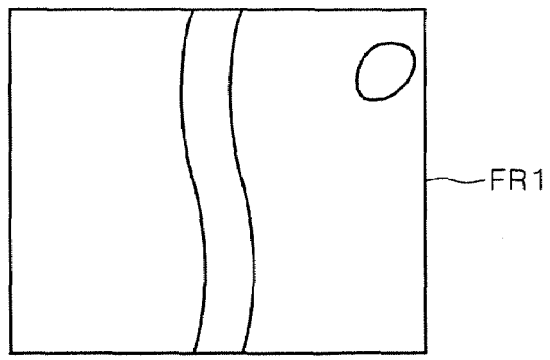
F I G . 3 0 B
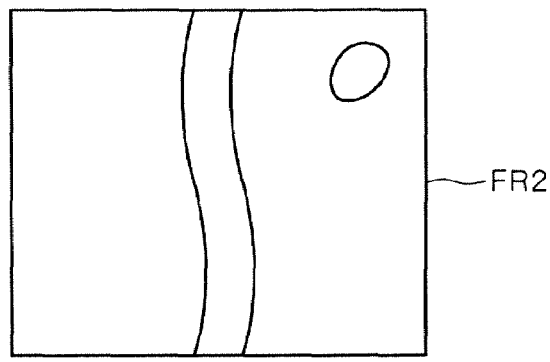
F I G . 3 0 C
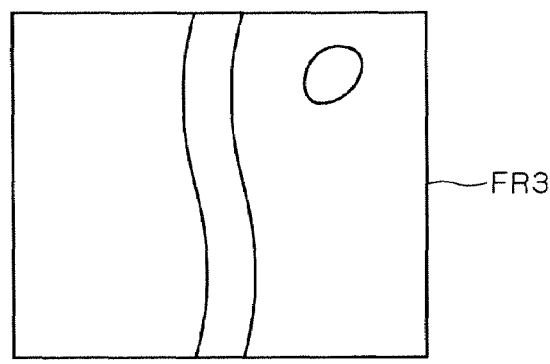
F I G . 3 0 D
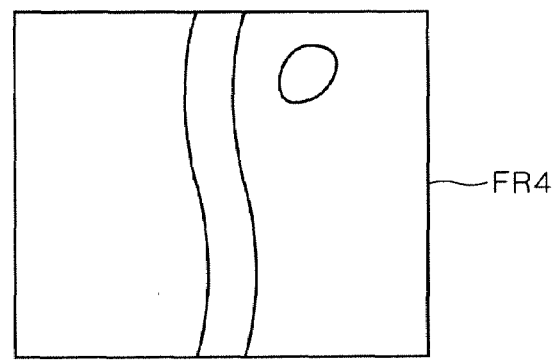

IMAGE PROCESSOR AND CAMERA SYSTEM, IMAGE PROCESSING METHOD, AND MOTION PICTURE DISPLAYING METHOD

BACKGROUND OF THE INVENTION

1. Field of the Invention

The present invention relates to an image processor for carrying out image processing on an image captured by rolling shutter type exposure, and also relates to a camera system equipped with such image processor, and an image processing method of processing such image and a motion picture displaying method.

2. Description of the Background Art

Conventionally known exposure techniques for capturing images are of global shutter type and rolling shutter type (also called "focal plane shutter type"). A global-shutter-type image capturing apparatus represented by an image capturing apparatus equipped with interline CCD (Charge Coupled Device) sensors provides almost the same exposure time period and exposure starting time for each pixel in one frame image. In contrast, a rolling-shutter-type image capturing apparatus represented by an image capturing apparatus equipped with CMOS sensors provides the same exposure time period but different exposure starting time for each pixel or each line of pixels in one frame image.

Since the rolling-shutter-type image capturing apparatus provides a different exposure starting time for each pixel or each line of pixels in one frame image as described above, hand shake of a user may cause a distortion of the whole screen of a frame image captured by such image capturing apparatus.

SUMMARY OF THE INVENTION

It is an object of the present invention to provide a technique capable of correcting an image distortion caused by the rolling shutter type exposure.

An image processor according to the present invention comprises: a similar-image detecting part configured to detect a similar image region in each of a plurality of frame images captured by rolling shutter type exposure, the similar image region being similar among the plurality of frame images; a displacement-vector detecting part configured to detect a displacement vector of the similar image region with respect to a common reference position among the plurality of frame images; an average calculating part configured to calculate an average of the displacement vectors in the plurality of frame images; and a correcting part configured to shift the similar image region in one of the plurality of frame images such that the displacement vector of the similar image region becomes the average.

An average of displacement vectors of similar image regions in the plurality of frame images is calculated, and the similar image region is shifted such that the displacement vector of the similar image region becomes the average. Since hand shake generally occurs at random in a plurality of frame images, the positions of similar image regions similar to one another among the plurality of frame images captured by the rolling shutter type exposure are displaced at random from their original position. Accordingly, an average of displacement vectors of similar image regions with respect to a reference position in the plurality of frame images becomes a value close to the displacement vector of the original position of the similar image regions with respect to the reference position. Therefore, shifting the similar image region such that the displacement vector of the similar image region becomes the average allows the similar image region to be brought close to the original position. This in result can reduce an image distortion caused by the rolling shutter type exposure.

According to an aspect of the invention, the similar image region is formed of a plurality of partial image regions located in the same line direction in a corresponding one of the plurality of frame images, each of the plurality of partial image regions being similar among the plurality of frame images. The positions of the plurality of partial image regions in a selected frame image from among the plurality of frame images are defined as reference positions. The displacement-vector detecting part detects displacement vectors of the plurality of partial image regions in one remaining frame image of the plurality of frame images with respect to the reference positions, calculates an average of the displacement vectors of the plurality of partial image regions in the one remaining frame image, and takes the average as the displacement vector of the similar image region in the one remaining frame image.

An average of displacement vectors of a plurality of partial image regions is used for the displacement vector of the similar image region. This reduces an influence upon correction processing caused by an error contained in the displacement vector. Accordingly, an image distortion resulting from the rolling shutter type exposure can be reduced reliably.

The present invention is also directed to a camera system for capturing an image.

The camera system comprises: an image capturing apparatus for capturing a plurality of frame images by rolling shutter type exposure; an image processor; and a sensor configured to detect the amount of shake of the camera system. The image processor includes: a similar-image detecting part configured to detect a similar image region in each of a plurality of frame images captured by rolling shutter type exposure, the similar image region being similar among the plurality of frame images; a displacement-vector detecting part configured to detect a displacement vector of the similar image region with respect to a common reference position among the plurality of frame images; an average calculating part configured to calculate an average of displacement vectors in the plurality of frame images; and a correcting part configured to shift, in one of the plurality of frame images, the similar image region by the amount of shake in a direction opposite to the direction of shake of the camera system when capturing the similar image region, and then to shift, in the one of the plurality of frame images, the similar image region such that the displacement vector of the similar image region becomes the average.

The frame images are corrected on the basis of the amount of shake of the camera system, an image distortion resulting from the rolling shutter type exposure can be corrected even when hand shake appears in agreement among the frame images.

The present invention is also directed to another camera system for capturing an image.

The camera system comprises: an image capturing apparatus for capturing a plurality of frame images by rolling shutter type exposure; and an image processor. The image processor includes an exposure-time determining part configured to determine an exposure time period in the image capturing apparatus and divide the exposure time period by the same number as the number of the plurality of frame images to obtain divided exposure time periods. The image capturing apparatus captures each of the plurality of frame images during a corresponding one of the divided exposure time periods. The image processor further includes: a similar-image detecting part configured to detect a similar image region in the plurality of frame images captured with the image capturing apparatus, the similar image region being similar among the plurality of frame images; a displacement-vector detecting part configured to detect a displacement vector of the similar image region with respect to a common reference position among the plurality of frame images; an average calculating part configured to calculate an average of displacement vectors in the plurality of frame images; a correcting part configured to shift the similar image region in each of the plurality of frame images such that the displacement vector of the similar image region becomes the average; and a frame-image generating part configured to generate a composite frame image corresponding to a frame image captured during the exposure time period on the basis of the plurality of frame images corrected in the correcting part.

The composite frame image corresponding to a frame image captured during the total exposure time period is generated on the basis of the plurality of frame images captured during short divided exposure time periods, respectively. This can reduce random noise occurring in image signals at image capturing.

According to an aspect of the invention, the frame-image generating part generates a plurality of composite frame images, and the camera system further comprises a display device configured to display a motion picture on the basis of the plurality of composite frame images.

Displaying a motion picture on the basis of the plurality of composite frame images in which image distortions resulting from the rolling shutter type exposure have been corrected. This can provide a user with a motion picture that is easy to see, which is advantageous because the image distortions resulting from the rolling shutter type exposure particularly in a motion picture give great discomfort on the user.

The present invention is also directed to an image processing method of processing an image captured by rolling shutter type exposure.

The present invention is also directed to a motion picture displaying method of displaying a motion picture on the basis of images generated by the above-described image processing method.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing the configuration of a camera system according to a first preferred embodiment of the present invention;

FIG. 2 is a diagram showing the structure of a CMOS sensor according to the first preferred embodiment;

FIG. 3 is a diagram showing the operation of the CMOS sensor according to the first preferred embodiment;

FIG. 21 shows image regions, each formed of block regions corresponding to one horizontal line including a correction unit image region;

FIG. 22 shows the method of correcting a similar block region according to the first preferred embodiment;

FIG. 23 shows a frame image with a moving region having been corrected;

FIGS. 30A to 30D show that hand shake appears in agreement among a plurality of frame images;

DESCRIPTION OF THE PREFERRED EMBODIMENTS

First Preferred Embodiment

Figure 4A:
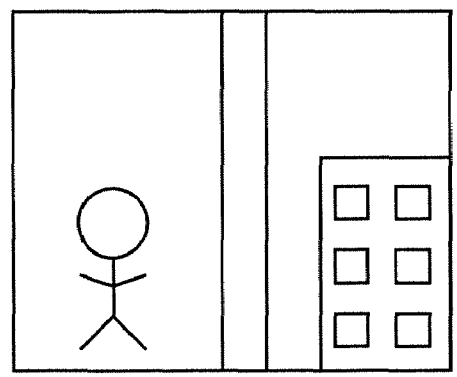
FIGS. 4A to 4C schematically show images captured by a CCD sensor and a CMOS sensor, respectively.

FIG. 1 is a block diagram showing the configuration of a camera system according to a preferred embodiment of the present invention. The camera system according to the present embodiment is a digital still camera, for example, for capturing images by the rolling shutter type exposure. As shown in FIG. 1, the camera system includes an image capturing apparatus 1 for capturing images, an image processor 2 for carrying out image processing on images captured by the image capturing apparatus 1, and a display device 3 for displaying images processed by the image processor 2. The image capturing apparatus 1, image processor 2 and display device 3 are housed in a single housing, for example.

The image capturing apparatus 1 has a lens unit 10, a CMOS sensor 11, a CMOS sensor driving circuit 12, a timing generator 13 and an A/D converter 14. The CMOS sensor 11 converts light incident from a subject through the lens unit 10 into an electric signal to capture an image and outputs the captured image as an analog image signal AIS. The timing generator 13 generates and outputs a timing signal TS, and the CMOS sensor driving circuit 12 controls the operation of the CMOS sensor 11 on the basis of the timing signal TS. The A/D converter 14 converts the analog image signal AIS outputted from the CMOS sensor 11 into a digital image signal DIS and outputs it.

The image processor 2 has a sensor processing unit (SPU) 20 for carrying out image processing on the digital image signal DIS outputted from the A/D converter 14 of the image capturing apparatus 1, a real-time processing unit (RPU) 21 for further carrying out real-time image processing on the digital image signal DIS as processed in the SPU 20, a CPU 22 for controlling the overall operation of the image processor 2, a memory 23 for storing operating programs for the CPU 22, a digital image signal DIS currently undergoing image processing or having undergone image processing, and the like, and a display interface 24. These components are connected to one another via a bus 25.

The SPU 20 carries out preprocessing such as black level correction, white balance correction and the like on the inputted digital image signal DIS. The digital image signal DIS processed in the SPU 20 is outputted to the bus 25 to be stored in the memory 23. The RPU 21 reads out the digital image signal DIS processed in the SPU 20 from the memory 23, and carries out various types of filtering such as pixel interpolation, noise reduction, sharpening and the like on the digital image signal DIS. The RPU 21 also carries out correction for correcting an image distortion resulting from the rolling shutter type exposure on the digital image signal DIS in conjunction with the CPU 22. The digital image signal DIS processed in the RPU 21 is then outputted to the bus 25 to be stored in the memory 23.

The CPU 22 reads out the digital image signal DIS having completed a series of image processing from the memory 23, and outputs it to the display interface 24. The CPU 22 also executes image compression such as JPEG compression on the digital image signal DIS having completed the series of image processing, and stores the compressed digital image signal DIS in the memory 23. The CPU 22 further outputs a timing control signal TCS to the timing generator 13, and the timing generator 13 controls the timing signal TS on the basis of the timing control signal TCS.

The display interface 24 converts the inputted digital image signal DIS into a format according to the display device 3 and outputs the converted digital image signal DIS to the display device 3. The display device 3 is a liquid crystal display (LCD), for example, and displays a stationary image on the basis of the inputted digital image signal DIS.

An image distortion caused by the rolling shutter type exposure will now be described along with the structure and operation of the CMOS sensor 11. FIG. 2 is a diagram showing the structure of the CMOS sensor 11. As shown in FIG. 2, the CMOS sensor 11 has a plurality of pixel sections 110 arrayed in a matrix in N rows and M columns (M, N≧2). More specifically, the CMOS sensor 11 has M pixel sections 110 arrayed in the horizontal line direction X on an image-capturing screen and N pixel sections 110 arrayed in the vertical line direction Y. Hereinafter, the horizontal line and vertical line may generically and simply be called "lines".

Each of the pixel sections 110 is formed by a photodiode 110a and an amplifier 110b. The photodiode 110a produces charges in accordance with the intensity of incident light and accumulates them, and the amount of accumulated charges increases as the irradiation time to the photodiode 110a increases. When a certain pixel section 110 is selected by the CMOS sensor driving circuit 12, the amplifier 110b of that pixel section 110 reads out charges accumulated in the photodiode 110a for amplification and outputs a pixel signal to the A/D converter 14. Hereinafter, a pixel section 110 in the n-th row (1≦n≦N) and m-th column (1≦m≦M) may be referred to as the "(n, m)th pixel section", and a pixel signal outputted therefrom may be called (n, m)th pixel signal.

FIG. 3 is a diagram showing the operation of the CMOS sensor 11. Arrows shown in the diagram indicate the timing at which pixel signals are read out from the pixel sections 110. As shown in FIG. 3, in the CMOS sensor 11 according to the present embodiment, M pixel sections 110 in the 1st row and 1st to M-th columns are selected sequentially, and pixel signals are sequentially read out from those M pixel sections 110. Then, M pixel sections 110 in the 2nd row and 1st to M-th columns are selected sequentially, and pixel signals are sequentially read out from those M pixel sections 110. Thereafter, pixel signals are similarly read out from pixel sections 110 in the 3rd row and 1st to M-th columns through pixel sections 110 in the N-th row and 1st to M-th columns, whereby an analog image signal AIS for one frame consisting of N×M pixel signals is obtained.

As described, in the CMOS sensor 11 according to the present embodiment, pixel signals are read out sequentially from M pixel sections 110 in a certain row and the 1st and subsequent columns under the control of the CMOS sensor driving circuit 12. After a pixel signal is read out from the pixel section 110 in the M-th column in that row, pixel signals are then read out sequentially from M pixel sections 110 in the next row and the 1st and subsequent columns. This means that the readout starting time of reading out pixel signals varies among N×M pixel sections 110 arrayed in the CMOS sensor 11. This is the characteristic of the rolling shutter type exposure.

In this CMOS sensor 11, as soon as a pixel signal is read out from a pixel section 110, the photodiode 110a of that pixel section 110 erases all accumulated charges and starts accumulating charges again. Accordingly, the exposure starting time varies among a plurality of pixel sections 110 among which the readout starting time of pixel signals varies. As shown in FIG. 3, a time between the readout starting time of a pixel signal and the readout starting time of the next pixel signal is equal between the plurality of pixel sections 110. This means that an exposure time period etd is equal between the plurality of pixel sections 110. Further, as shown in FIG. 3, in the CMOS sensor 11, a time difference std in exposure starting time between two pixel sections 110 from which pixel signals are read out sequentially is constant.

In contrast, when the entire surface of an interline CCD sensor simultaneously receives light from a subject with no mechanical shutter being provided, the charge accumulation starting time and accumulation time period are constant between a plurality of pixel sections in the CCD sensor. This means that the exposure starting time and exposure time period are constant between the plurality of pixel sections in the CCD sensor.

Figure 4B:
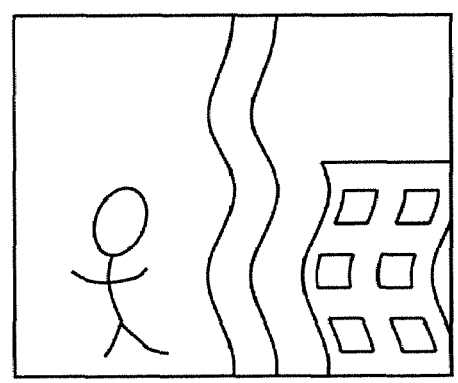
Figure 4C:
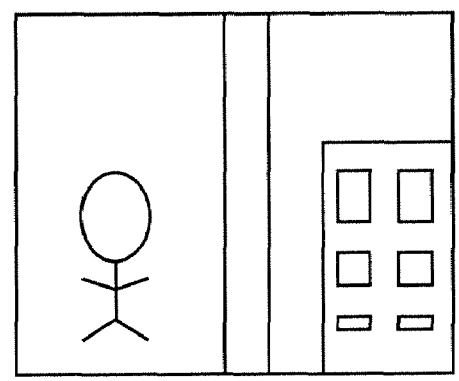

FIGS. 4A to 4C schematically show frame images when capturing an image of a stationary subject by a CCD sensor and a CMOS sensor, respectively. FIG. 4A shows a frame image captured by a CCD sensor, and FIGS. 4B and 4C show frame images captured by a CMOS sensor. When capturing an image by a CCD sensor, there is no distortion in the whole screen as shown in FIG. 4A while the whole screen of the frame image may be blurred by hand shake of a user. In contrast, in the case of capturing an image by a CMOS sensor, user's hand shake, when occurred in the lateral direction of a captured image screen, i.e., in the horizontal line direction X, causes a positional difference of a subject at the exposure starting time between one pixel section and another due to the difference in exposure starting time between the pixel sections, which results in a lateral distortion in the whole screen of the frame image as shown in FIG. 4B. When user's hand shake occurs in the longitudinal direction of the captured image screen, i.e., vertical line direction Y, a vertical distortion occurs in the whole screen of the frame image as shown in FIG. 4C.

In the CMOS sensor 11 according to the present embodiment, exposure is started sequentially in the horizontal line direction X, however, exposure may be started sequentially in the vertical line direction Y. In other words, the scanning direction in the CMOS sensor 11 may be either the horizontal line direction X or vertical line direction Y. When scanning in the CMOS sensor 11 is to be performed in the vertical line direction Y, pixel signals are read out sequentially from N pixel sections 110, i.e., the (1, 1)th to (N, 1)th pixel sections 110. Pixel signals are then read out sequentially from N pixel sections 110, i.e., the (1, 2)th to (N, 2)th pixel sections 110. Thereafter, pixel signals are similarly read out sequentially from pixel sections 110 in the 3rd to M-th columns.

As described, when capturing an image of a subject by the rolling shutter type exposure, user's hand shake may cause a distortion in the whole screen of a frame image. In the present embodiment, such image distortion resulting from the rolling shutter type exposure (hereinafter also called "the rolling shutter effect") can be corrected by operation of the RPU 21 and CPU 22 of the image processor 2 in conjunction with each other.

Figure 5:
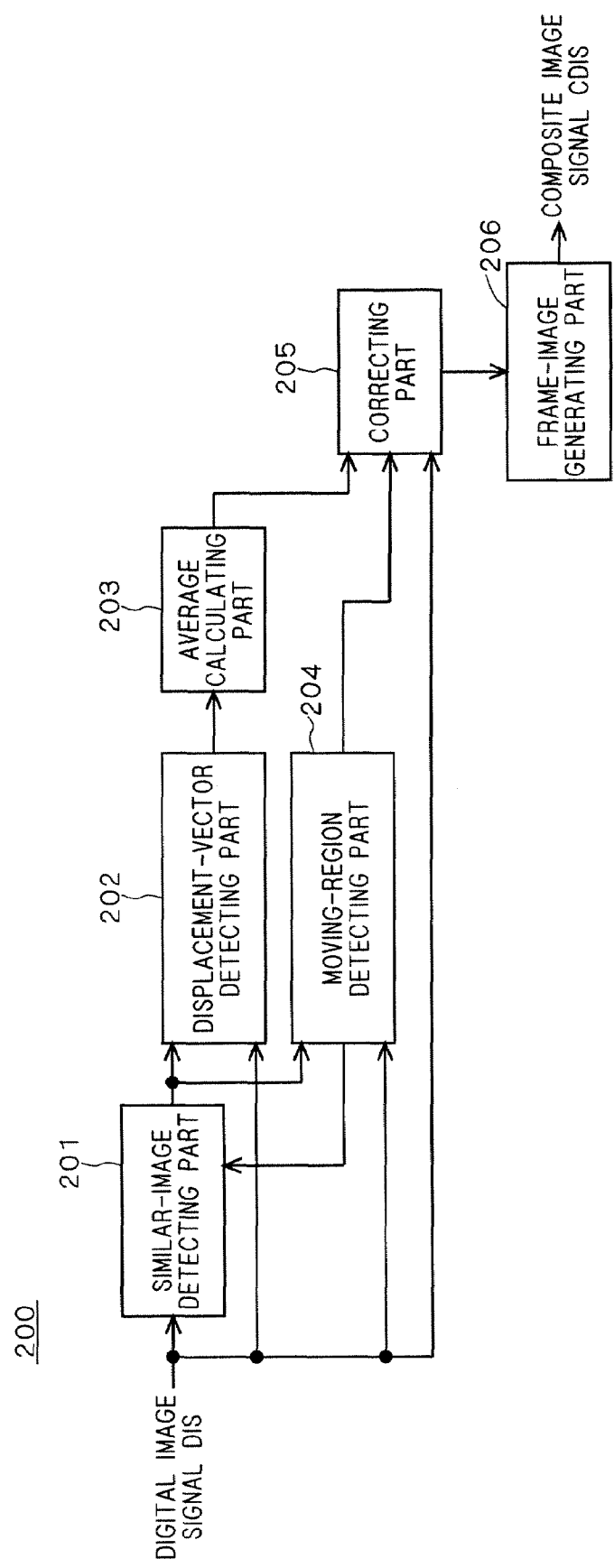
FIG. 5 is a functional block diagram of an image-distortion correction device according to the first preferred embodiment.

FIG. 5 is a functional block diagram of an image-distortion correction device 200 formed in the image processor 2 by operation of the RPU 21 and CPU 22 in conjunction with each other. As shown in FIG. 5, the image-distortion correction device 200 has a similar-image detecting part 201, a displacement-vector detecting part 202, an average calculating part 203, a moving-region detecting part 204, a correcting part 205 and a frame-image generating part 206, and performs processing on a set of a plurality of frame images captured sequentially with the image capturing apparatus 1.

The similar-image detecting part 201 detects similar image regions similar to one another in a set of a plurality of frame images. The moving-region detecting part 204 detects a moving region MVR, i.e., an image region of a moving subject in each of the plurality of frame images. The displacement-vector detecting part 202 detects displacement vectors of each similar image region place by place with respect to a reference position in each of the plurality of frame images. The average calculating part 203 calculates an average of displacement vectors of similar image regions in the plurality of frame images. The correcting part 205 corrects the similar image region in each of the plurality of frame images on the basis of the average calculated by the average calculating part 203. The correcting part 205 further corrects the moving region MVR in any one of the plurality of frame images. The frame-image generating part 206 superimposes frame images corrected by the correcting part 205 upon one another to generate one composite frame image, and outputs the digital image signal DIS of that composite frame image as a composite image signal CDIS.

Figure 6:
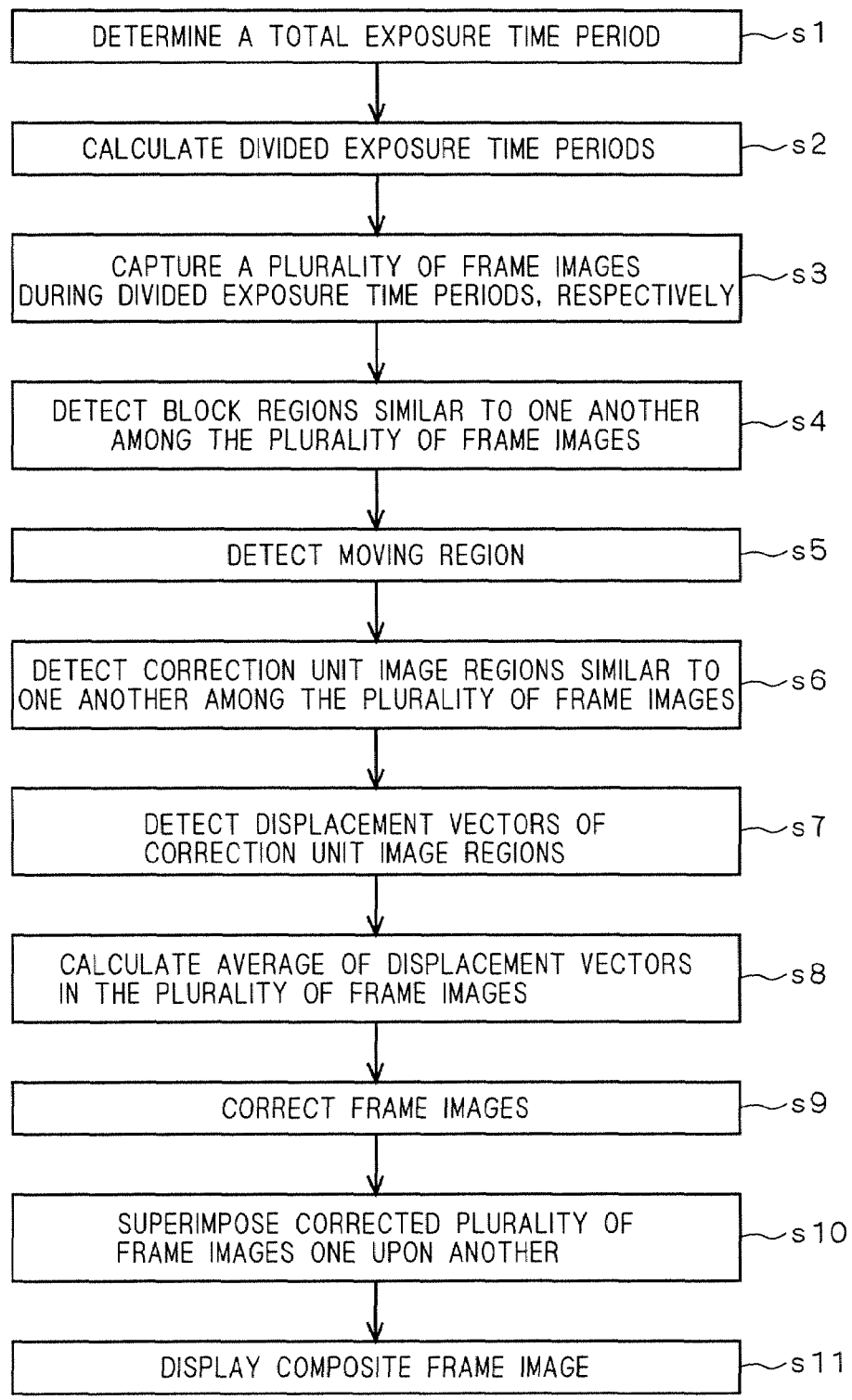
FIG. 6 is a flow chart of an operation of the camera system according to the first preferred embodiment.
Figure 7A:
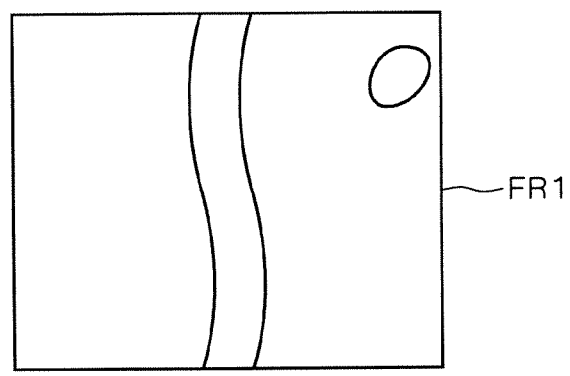
FIGS. 7A to 7D show examples of a plurality of frame images captured by the image capturing apparatus according to the first preferred embodiment.
Figure 7B:
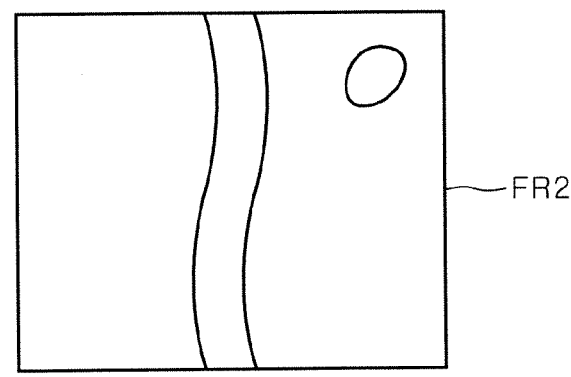
Figure 7C:
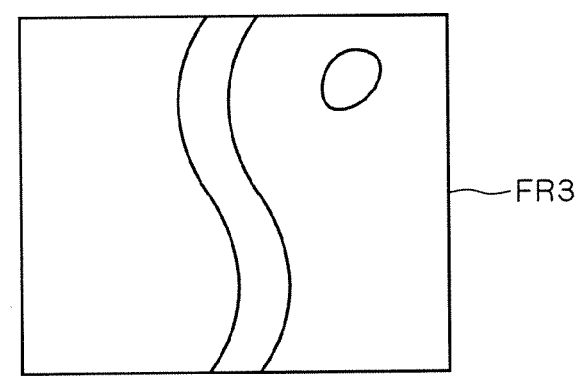
Figure 7D:
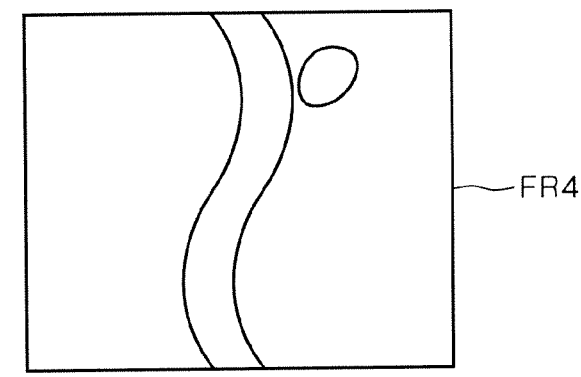

FIG. 6 is a flow chart of the operation of the camera system according to the preferred embodiment until a stationary image is displayed. In the camera system according to the preferred embodiment, for displaying a stationary image captured during a predetermined exposure time period, the predetermined exposure time period is divided into a plurality of times, a plurality of frame images are captured during the resultant short exposure time periods, respectively, and one composite frame image obtained by superimposing these plurality of frame images one upon another is displayed on the display device 3 as a stationary image captured during the predetermined exposure time period.

As shown in FIG. 6, in step s1, the CPU 22 determines an exposure time period required in the image capturing apparatus 1. The exposure time period determined in step s1 is called "total exposure time period". For instance, the CPU 22 determines the total exposure time period on the basis of the illumination in the image capturing environment outputted from an illumination sensor not shown and information on the performance of the CMOS sensor 11 previously stored in the memory 23. Next, in step s2, the CPU 22 divides the total exposure time period into a plurality of times. Here, the number of divisions shall be L ($\geq 3$), and the plurality of times obtained by dividing the total exposure time period are each called "divided exposure time period".

Next, in step s3, the image capturing apparatus 1 captures L frame images as many as the number of divisions of the total exposure time period, during the divided exposure time periods obtained in step s2, respectively. More specifically, in step s3, the CPU 22 controls the timing control signal TCS on the basis of the divided exposure time periods obtained in step s2, and the timing generator 13 controls the timing signal TS on the basis of the inputted timing control signal TCS. Then, the CMOS sensor driving circuit 12 controls the operation of the CMOS sensor 11 on the basis of the inputted timing signal TS. The respective pixel sections 110 in the CMOS sensor 11 thereby accumulate charges during accumulation time periods in accordance with the divided exposure time periods obtained in step s2, respectively, and amplify them. Then, the respective pixel sections 110 output them as pixel signals. The respective pixel signals are inputted to the A/D converter 14, and the A/D converter 14 outputs a digital image signal DIS for one frame. This operation is repeated L times continuously, so that L frame images are obtained in the image capturing apparatus 1.

FIGS. 7A to 7D show examples of a plurality of frame images captured in step s3. FIGS. 7A to 7D show frame images FR1 to FR4 obtained by sequentially capturing four frames of images of a ball moving in the lateral direction of the image screen and a stationary pole. The frame images FR1 to FR4 are shown in ascending order of image-capturing time from top of the sheet of drawing. Accordingly, the position of the image of the ball varies among the frame images FR1 to FR4 from one another. It is assumed that user's hand shake occurs in the lateral direction of the image screen when capturing the frame images FR1 to FR4.

With the occurrence of user's hand shake in the lateral direction of the image screen when capturing the frame images FR1 to FR4, a distortion occurs in the lateral direction in the whole screen in each of the frame images FR1 to FR4, resulting in a lateral distortion in the image of the pole. Since hand shake generally occurs at random in the frame images FR1 to FR4, the shape of the image of the pole varies among the frame images FR1 to FR4.

Not only when hand shake occurs in capturing an image of a stationary subject with the image capturing apparatus 1, but also when capturing an image of a moving subject with the image capturing apparatus 1, the position of the subject at the exposure starting time varies between a pixel position and another due to the difference in exposure starting time between the pixel positions, resulting in a distortion in the image of the moving subject. Therefore, the image of the ball in each of the frame images FR1 to FR4 has a distortion resulting from both the occurrence of hand shake and movement of the subject. Hereinafter, the operation of the camera system will be described assuming that the frame images FR1 to FR4 as shown in FIGS. 7A to 7D are captured in step s3.

When the frame images FR1 to FR4 are captured with the image capturing apparatus 1, the RPU 21 of the image processor 2 carries out pixel interpolation on digital image signals DIS for four frames outputted from the A/D converter 14. Then, in step s4, the similar-image detecting part 201 detects minute image regions similar to one another among the four frame images FR1 to FR4 having undergone pixel interpolation.

In step s4, the similar-image detecting part 201 selects arbitrary one of the frame images FR1 to FR4 as a reference frame image. In the present embodiment, the frame image FR1 is defined as the reference frame image, and hereinafter may be called "a reference frame image FR1" as well. The similar-image detecting part 201 detects, in each of the frame images FR2 to FR4, image regions respectively similar to a plurality of minute image regions in the reference frame image FR1. The processing will be described below in detail.

Figure 8:
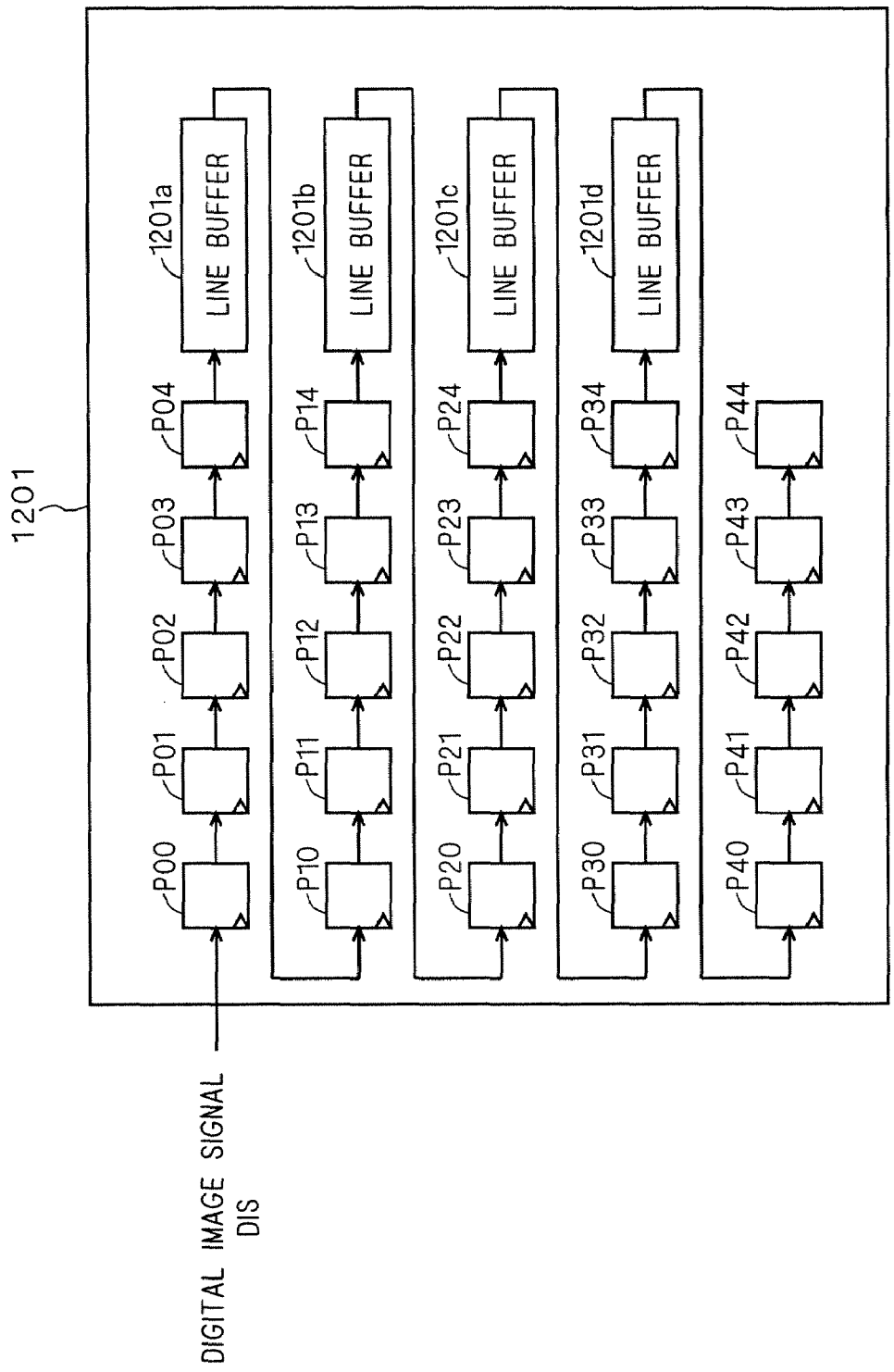
FIG. 8 is a block diagram showing the configuration of an image memory according to the first preferred embodiment.

FIG. 8 is a block diagram showing the configuration of an image memory 1201 included in the similar-image detecting part 201. As shown in FIG. 8, the image memory 1201 has twenty-five resistors P00 to P44 arrayed in five rows and five columns and four line buffers 1201a to 1201d. Each of the resistors P00 to P44 is capable of storing a pixel signal for one pixel, and each of the line buffers 1201a to 1201d is a FIFO memory capable of storing pixel signals for (M-5) pixels.

Five resisters P00 to P04 in the 1st row, line buffer 1201a, five resistors P10 to P14 in the 2nd row, line buffer 1201b, five resistors P20 to P24 in the 3rd row, line buffer 1201c, five resistors P30 to P34 in the 4th row, line buffer 1201d and five resistors P40 to P44 in the 5th row are connected in series in this order.

The resistors P00 to P44 and line buffers 1201a to 1201d each receive a clock signal not shown. The resistors P00 to P44 each latch an inputted signal when a clock signal rises, and outputs it to the subsequent stage. When the clock signal rises, the line buffers 1201a to 1201d each latch a current inputted signal as well as outputting an inputted signal latched on the rising edge of the (M-5)th clock signal earlier, to a resistor of the subsequent stage. In short, the line buffers 1201a to 1201d each latch an inputted signal during (M-5) clocks, and outputs the inputted signal to a resistor of the subsequent stage after the lapse of (M-5) clocks. Here, "clock" means the time interval between two consecutive rising edges of clock signals.

The resistor P00 receives N×M pixel signals for one frame in series in synchronization with a clock signal. More specifically, the resistor P00 sequentially receives a (1, 1)th pixel signal to a (1, M)th pixel signal, and then, sequentially receives a (1, 2)th pixel signal to a (2, M)th pixel signal. Thereafter, similarly, the resistor P00 sequentially receives a (3, 1)th pixel signal to a (N, M)th pixel signal.

In the image memory 1201 configured as such, a (1, 1)th pixel signal in a certain frame image is stored in the resistor P00 on the rising edge of a clock signal, and on the rising edge of the next clock signal, the (1, 1)th pixel signal is stored in the resistor P01 while a (1, 2)th pixel signal is stored in the resistor P00. Then, on the rising edge of the next clock signal, the (1, 1)th pixel signal is stored in the resistor P02 while the (1, 2)th pixel signal is stored in the resistor P01, and a (1, 3)th pixel signal is stored in the resistor P00. Thereafter, similarly, at the same time when the (1, 1)th pixel signal is stored in the resistor P04 on the rising edge of a clock signal, the (1, 2)th pixel signal is stored in the resistor P03, the (1, 3)th pixel signal is stored in the resistor P02, a (1, 4)th pixel signal is stored in the resistor P01, and a (1, 5)th pixel signal is stored in the resistor P00.

On the rising edge of the next clock signal, the (1, 1)th pixel signal is stored in the line buffer 1201a, and on the rising edge of the succeeding (M-5)th clock signal, the pixel signal is outputted from the line buffer 1201a to be stored in the resistor P10. Then, similarly, when the (1, 1)th pixel signal is stored in the resistor P44, pixel signals in the 5th row and 1st to 5th columns are stored in the five resistors P00 to P04 in the 1st line, pixel signals in the 4th row and 1st to 5th columns are stored in the five resistors P10 to P14 in the 2nd line, pixel signals in the 3rd row and 1st to 5th columns are stored in the five resistors P20 to P24 in the 3rd line, pixel signals in the 2nd row and 1st to 5th columns are stored in the five resistors P30 to P34 in the 4th line, and pixel signals in the 1st row and 1st to 5th columns are stored in the five resistors P40 to P44 in the 5th line. Thereafter, the image memory 1201 carries out a similar operation until the (N, M)th pixel signal is stored in the resistor P00.

In the image memory 1201 carrying out such operation, the twenty-five resistors P00 to P44 temporarily store twenty-five pixel signals in a minute image region formed by N×M pixels in one frame image. In the present embodiment, a minute image region formed by 5×5 pixels is called "a block region", and block regions in the frame images FR1 to FR4 are called block regions BL1 to BL4, respectively.

In step s4, first, N×M pixel signals in the frame image FR2 are sequentially inputted to the image memory 1201. Then, pixel signals in the frame image FR2 inputted to the resistors P00 to P44 of the image memory 1201 are compared to pixel signals in the reference frame image FR1, to thereby specify, in the frame image FR2, the block region BL2 similar to the block region BL1 in the reference frame image FR1 based on the result of comparison. Hereinafter, a (n-1, m-1)th pixel signal in the frame image FR2 will be referred to as "a pixel signal Anm" and a (n-1, m-1)th pixel signal in the reference frame image FR1 will be referred to as "a pixel signal Qnm".

Figure 9:
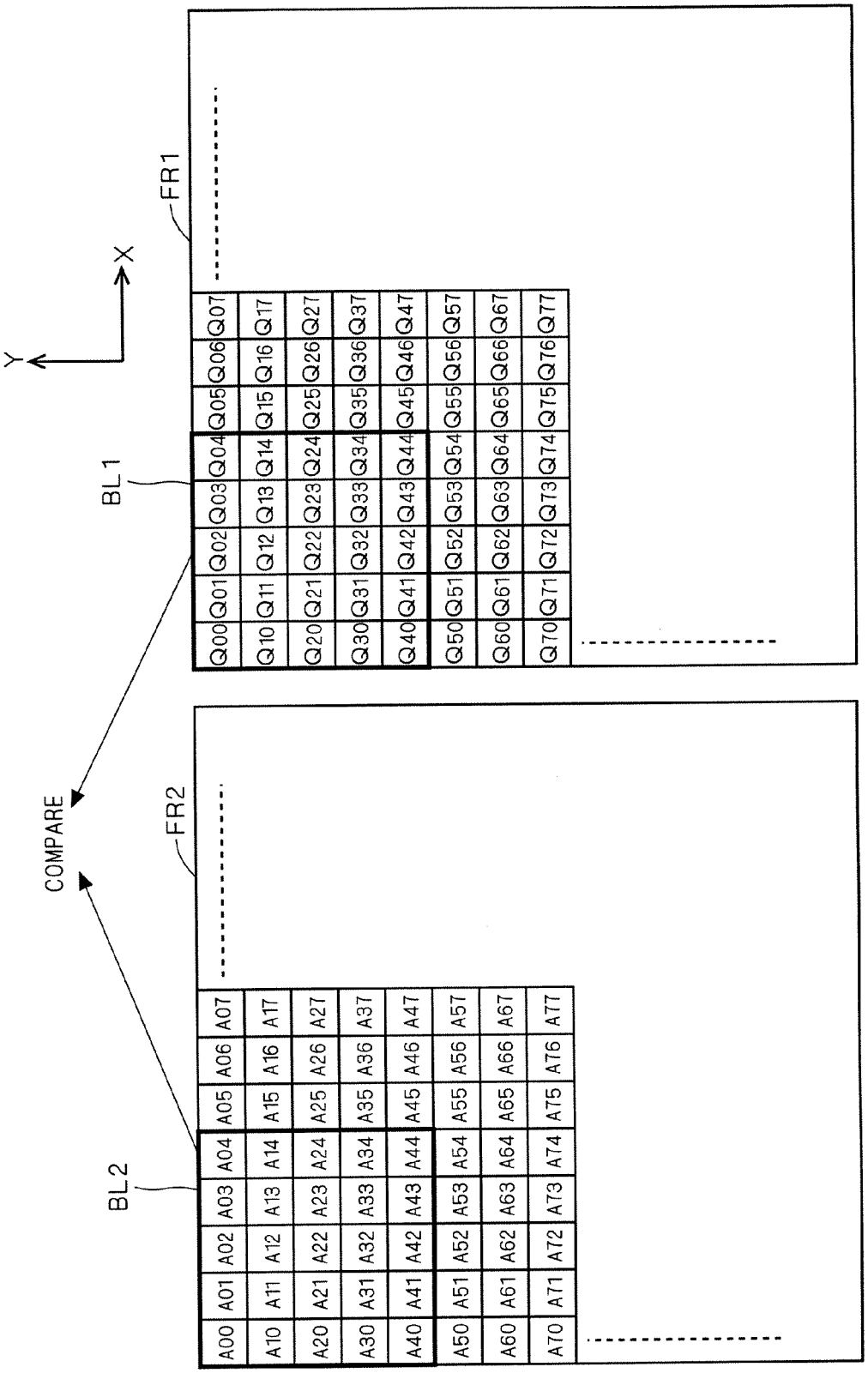
FIGS. 9 through 13 show a method of detecting a similar block region according to the first preferred embodiment.

FIGS. 9 through 13 show the method of detecting, in the frame image FR2, the block region BL2 similar to the block region BL1 in the reference frame image FR1. As shown in FIG. 9, in the reference frame image FR1, attention shall be given to a block region BL1 formed by a plurality of 5×5 pixels where the (1, 1)th pixel and the (5, 5)th pixel are diagonally opposite to each other. In the frame image FR2, attention should be given to a block region BL2 formed by a plurality of 5×5 pixels where the (1, 1)th pixel and the (5, 5)th pixel are diagonally opposite to each other. When pixel signals A00 to A04, A10 to A14, A20 to A24, A30 to 34 and A40 to A44 in the block region BL2 are outputted from the resistors P00 to P44 of the image memory 1201, these pixel signals are compared to pixel signals Q00 to Q04, Q10 to Q14, Q20 to Q24, Q30 to Q34 and Q40 to Q44 in the block region BL1 of the reference frame image FR1 on a pixel-by-pixel basis. More specifically, the absolute value of a difference between a pixel signal in the block region BL1 and a pixel signal in the same position as that pixel signal in the block region BL2 is calculated. Such calculation of the absolute value is made for all the pixel signals in the block regions BL1 and BL2. Then, the total sum of calculated absolute values is obtained. Hereinafter, the total sum will be mentioned as "similarity". As the similarity decreases, the block regions BL1 and BL2 become more similar to each other.

Figure 10:
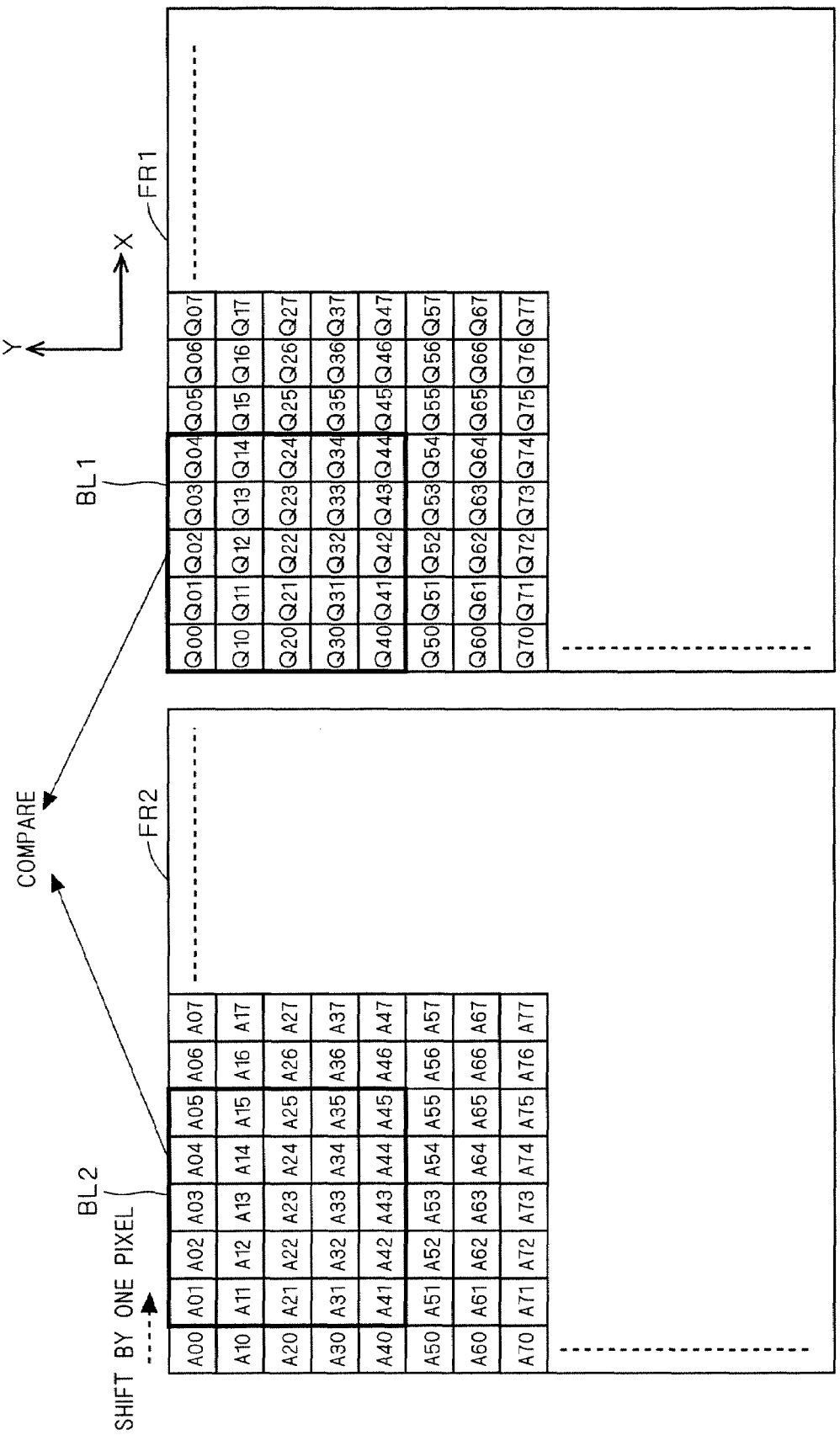

Next, as shown in FIG. 10, when a new clock signal to the image memory 1201 rises, pixel signals A01 to A05, A11 to A15, A21 to A25, A31 to A35 and A41 to A45 in a block region BL2 shifted from the block region BL2 shown in FIG. 9 by one pixel in the horizontal line direction X are outputted from the resistors P00 to P44 of the image memory 1201. Then, similarly, these pixel signals are compared to pixel signals in the block region BL1 on a pixel-by-pixel basis, to thereby obtain the similarity between the block regions BL1 and BL2. At this time, the block region BL1 is located in the same position as shown in FIG. 9.

Next, when a new clock signal to the image memory 1201 rises, pixel signals A02 to A06, A12 to A16, A22 to A26, A32 to A36 and A42 to A46 in a block region BL2 shifted from the block region BL2 shown in FIG. 10 by one pixel in the horizontal line direction X are outputted from the resistors P00 to P44 of the image memory 1201. Then, similarly, these pixel signals are compared to pixel signals in the block region BL1 on a pixel-by-pixel basis, to thereby obtain the similarity between the block regions BL1 and BL2. Thereafter, similar operations are carried out to obtain the similarity between the block region BL1 and the block region BL2 located at the outermost edge of the frame image FR2, i.e., the block region BL2 where the (1, M-4)th pixel and the (4, M)th pixel are diagonally opposite to each other. Next, giving attention to a block region BL2 shifted from the previous block region BL2 by one pixel in the vertical line direction Y, the similarity between the block region BL1 and the block region BL2 where the (2, 1)th pixel and the (6, 5)th pixel are diagonally opposite to each other is obtained. Then, similarly, the similarity between the block region BL1 and a block region BL2 shifted from the previous block region BL2 by one pixel in the horizontal line direction X is obtained. When the similarity between the block region BL1 and the block region BL2 located at the outermost edge of the frame image FR2 is obtained, attention is now given to a block region BL2 shifted further by one pixel in the vertical line direction Y, and a similar operation is carried out.

Figure 11:
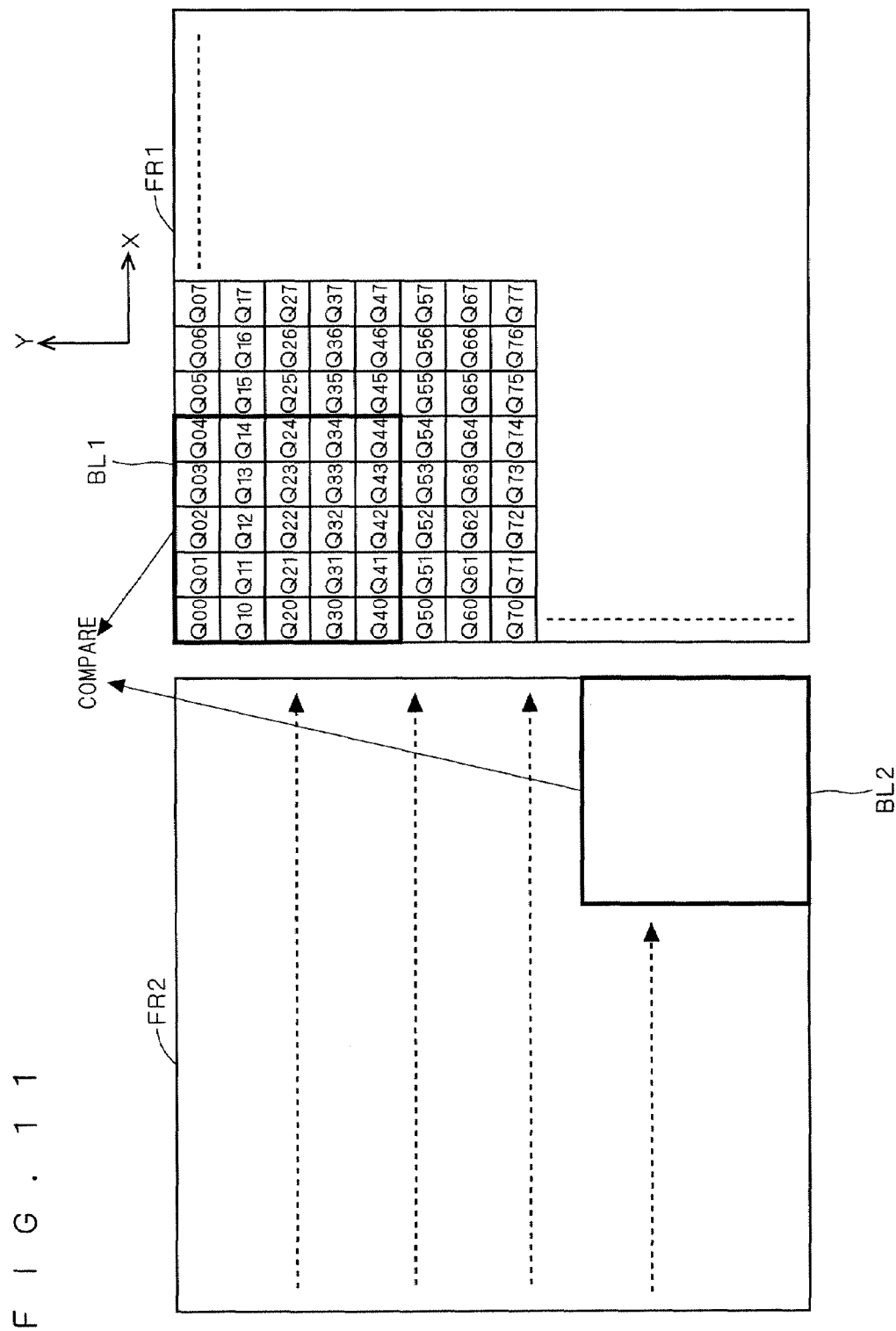

The above operation is carried out until the similarity between the block region BL1 and the block region BL2 located at the right lowermost edge as shown in FIG. 11, i.e., the block region BL2 where the (N-4, M-4)th pixel and the (N, M)th pixel are diagonally opposite to each other is obtained, at which time (N-4)×(M-4) pieces of similarity are obtained. Then, a block region BL2, if any, having the smallest value among these obtained pieces of similarity and a value smaller than a predetermined threshold value is determined as an image region in the frame image FR2 similar to the block region BL1 where the (1, 1)th pixel and the (5, 5)th pixel are diagonally opposite to each other. In contrast, when there is no value smaller than the predetermined threshold value in the obtained pieces of similarity, it is judged that there is no image region in the frame image FR2 similar to the block region BL1 where the (1, 1)th pixel and the (5, 5)th pixel are diagonally opposite to each other.

Figure 12:
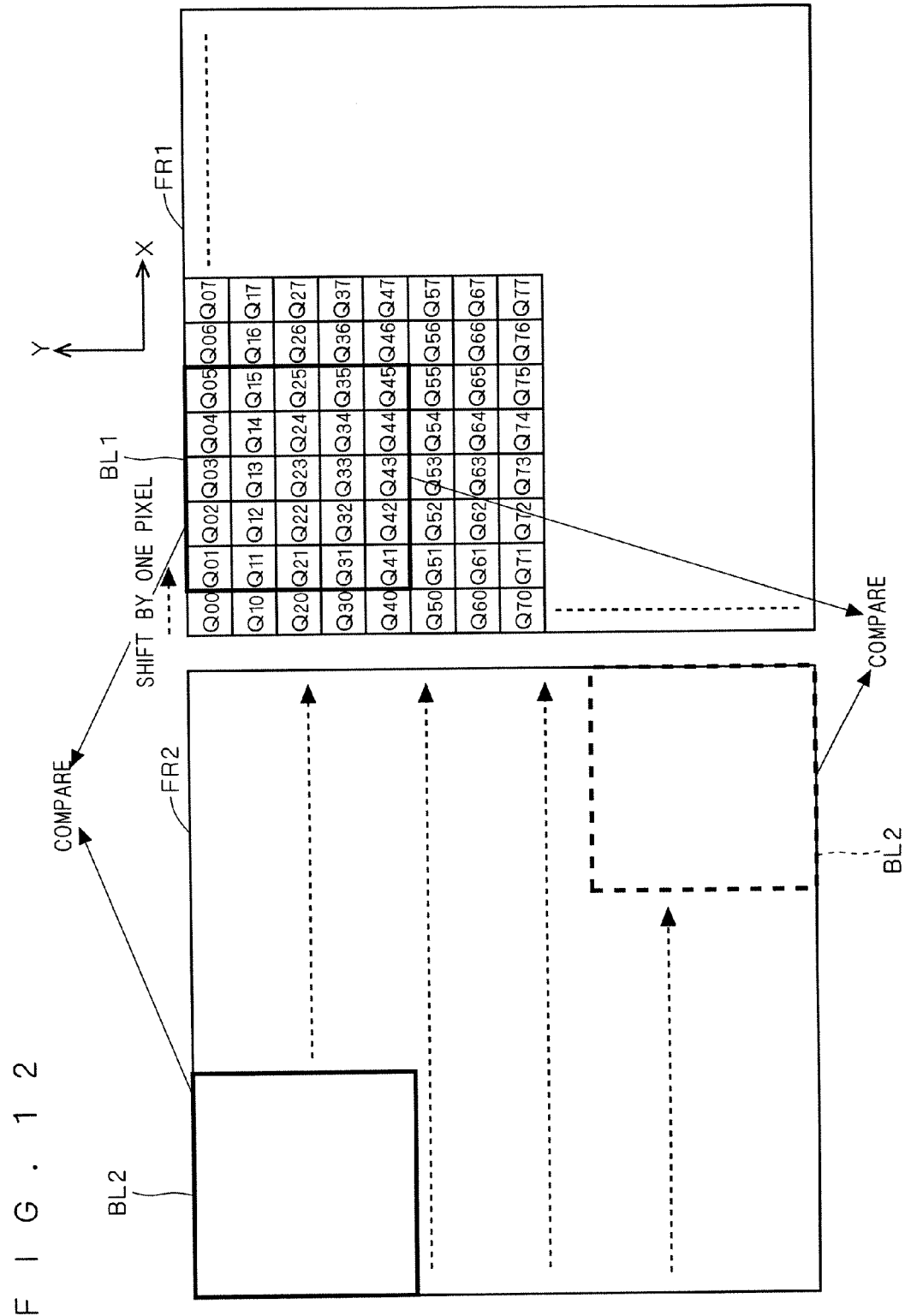

When detection of the block region BL2 similar to the block region BL1 in the reference frame image FR1 shown in FIG. 9 is thus finished, then, attention is now given to a block region BL1 shifted from the previous block region BL1 shown in FIG. 9 by one pixel in the horizontal line direction X in the reference frame image FR1, as shown in FIG. 12, where the (1, 2)th pixel and the (5, 6)th pixel are diagonally opposite to each other. Pixel signals in the frame image FR2 are newly inputted to the image memory 1201, and a similar operation is carried out to detect the block region BL2 similar to that block region BL1 from the frame image FR2.

Figure 13:
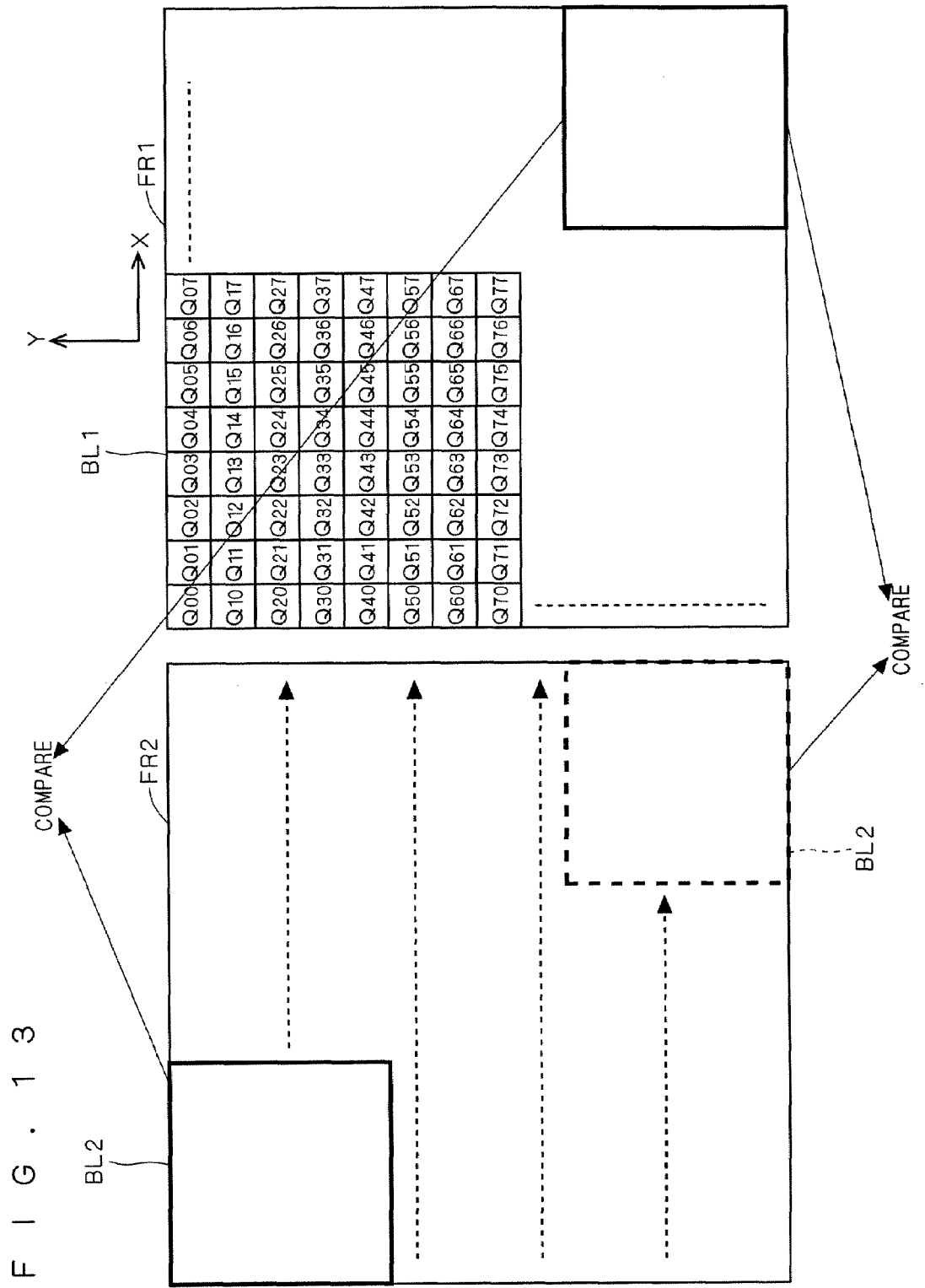

When detection of the block region BL2 similar to the block region BL1 shown in FIG. 12 in the frame image FR2 is finished, the block region BL1 is further shifted by one pixel in the horizontal line direction X, to thereby carry out a similar operation. When the block region BL1 is shifted to one outermost edge of the reference frame image FR1, the block region BL1 is shifted downward by one pixel, and similar operations are carried out while shifting the block region BL1 to the other outermost edge of the reference frame image FR1. Such operations are carried out until detection of a block region BL2 similar to the block region BL1 located at the right lowermost edge, as shown in FIG. 13, where the (N-4, M-4)th pixel and the (N, M)th pixel are diagonally opposite to each other is finished.

In this manner, when a block region BL2 similar to each of (N-4)×(M-4) block regions BL1 in the reference frame image FR1 is detected in the frame image FR2, N×M pixel signals in the frame image FR3 are similarly inputted sequentially to the image memory 1201 to compare the block region BL1 in the reference frame image FR1 and block region BL3 in the frame image FR3, so that a block region BL3 similar to each of the (N-4)×(M-4) block regions BL1 in the reference frame image FR1 is detected in the frame image FR3. Then, N×M pixel signals in the frame image FR4 are similarly inputted sequentially to the image memory 1201 to compare the block region BL1 in the reference frame image FR1 and block region BL4 in the frame image FR4, so that a block region BL4 similar to each of the (N-4)×(M-4) block regions BL1 in the reference frame image FR1 is detected in the frame image FR4.

Figure 14A:
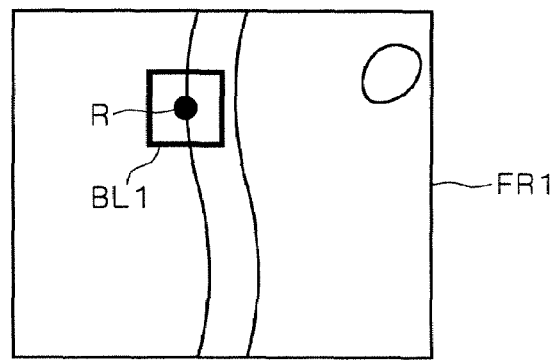
FIGS. 14A to 14D show similar block regions similar to one another among the plurality of frame images.
Figure 14B:
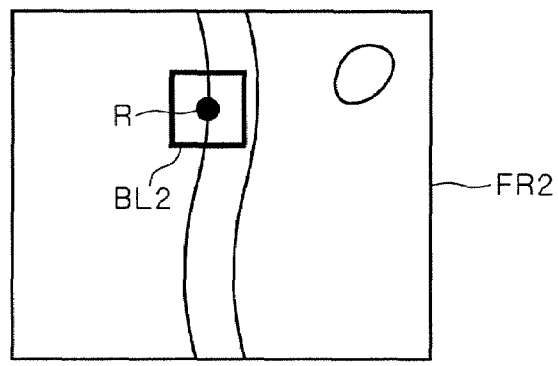
Figure 14C:
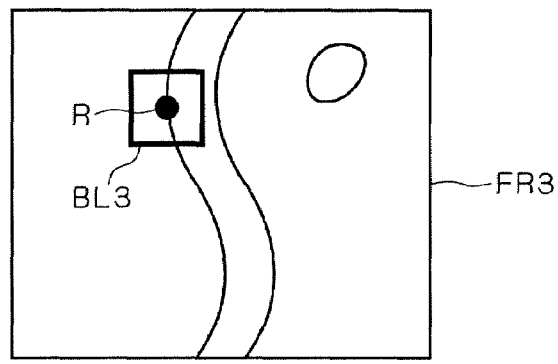
Figure 14D:
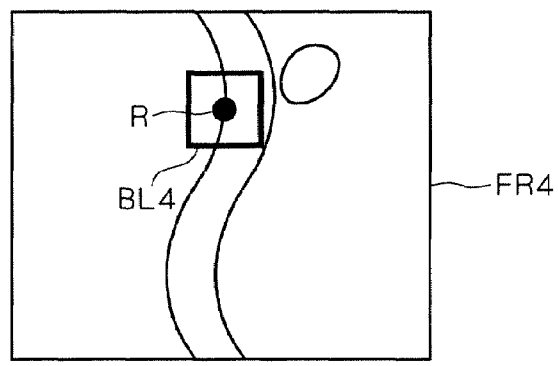

Next, the similar-image detecting part 201 specifies block regions similar to one another among the frame images FR1 to FR4 based on the above results of detection. More specifically, a set of block regions BL1 to BL4 similar to one another is specified based on the results of detection between the block regions BL1 and BL2, between the block regions BL1 and BL3, and between the block regions BL1 and BL4. FIGS. 14A to 14D show a set of block regions BL1 to BL4 similar to one another. FIG. 14A shows a block region BL1 in the reference frame image FR1, and FIGS. 14B to 14D show block regions BL2 to BL4, respectively, similar to that block region BL1. In FIGS. 14A to 14D, a central pixel R of each of the block regions BL1 to BL4 is shown. Since hand shake generally occurs at random in the frame images FR1 to FR4, the image position in the frame image may vary among the block regions BL1 to BL4 similar to one another, as shown in FIGS. 14A to 14D.

Hereinafter, block regions in the frame images FR1 to FR4 similar to one another may be called "similar block regions", and similar block regions in the frame images FR1 to FR4 may be called similar block regions BL1 to BL4, respectively.

Next, in step s5, the moving-region detecting part 204 detects the moving region MVR in each of the frame images FR1 to FR4. That is, an image region of the moving ball is detected in each of the frame images FR1 to FR4.

More specifically, in step s5, the moving-region detecting part 204 first obtains a motion vector between the block regions BL1 and BL2 in each combination of block regions BL1 and BL2 similar to each other is obtained, and the absolute value thereof, i.e., a motion vector amount mva is further obtained. Letting the X and Y coordinates of the central pixel R of the block region BL1 be x1 and y1, respectively, and the X and Y coordinates of the central pixel R of the block region BL2 in the frame image FR2 similar to that block region BL1 be x2 and y2, respectively, the motion vector amount mva is obtained by the following equation (1):

$$mva = \sqrt{(x1-x2)^2 + (y1-y2)^2} \quad (1)$$

The moving-region detecting part 204 judges whether the motion vector amount mva is larger than a predetermined threshold value for each combination of block regions BL1 and BL2. When the motion vector amount mva is larger than the predetermined threshold value, the moving-region detecting part 204 determines each of the block regions BL1 and BL2 corresponding to that motion vector amount mva as moving block regions, respectively. Then, an image region formed by all moving block regions in the reference frame image FR1 is determined as a moving region MVR in the reference frame image FR1, and an image region formed by all moving block regions in the frame image FR2 is determined as a moving region MVR in the frame image FR2. Accordingly, a region almost the same as the image region of the ball which is a moving subject is detected in each of the frame images FR1 and FR2 shown in FIGS. 7A and 7B, respectively, as the moving region MVR. As to image signals in an area where a plurality of moving block regions overlap one another in the moving region MVR, an image signal of any one of those moving block regions is employed.

Generally, the range of motion of the moving region MVR between frame images is significantly greater than the range of motion of image region of a stationary subject between frame images caused by hand shake. Therefore, appropriately setting the value of the aforementioned threshold value to be compared to the motion vector mva achieves correct detection of image region of a moving subject as the moving region MVR.

Further, the moving-region detecting part 204 selects an arbitrary moving block region in the reference frame image FR1, to determine the motion vector between that moving block region and its corresponding moving block region in the frame image FR2 as the motion vector between the moving regions MVR of the reference frame image FR1 and frame image FR2.

A similar operation is carried out between the frame images FR1 and FR3 and between the frame images FR1 and FR4, to thereby detect the moving region MVR in each of the frame images FR3 and FR4 as well as obtaining the motion vector between the moving regions MVR of the frame images FR1 and FR3 and the motion vector between the moving regions MVR of the frame images FR1 and FR4. In this manner, the moving region MVR is detected in each of the four frame images FR1 to FR4 in step s5.

As described above, in the CMOS sensor in which scanning is performed in the horizontal line direction or vertical line direction, the exposure starting time varies between pixel sections adjacent to each other in one line in a strict sense, however, exposure is expected to start almost at the same time in one line since the difference in exposure starting time between pixel sections is very small in one line. Further, since time required for subjecting one line to exposure is extremely short, hand shake seems to occur uniformly in one line. Therefore, in one frame image, an image distortion resulting both from hand shake and rolling shutter type exposure hardly seems to occur in an image region formed of a plurality of minute block regions located in the same line direction.

On the other hand, a distortion resulting both from hand shake and movement of a subject occurs in the moving region MVR. Thus, consideration must be given separately from an image of a stationary subject containing a distortion which results only from hand shake.

Therefore, in the present embodiment, consideration will be given to an image region formed of a plurality of similar block regions located in the same horizontal line direction except the aforementioned moving block region in each of the frame images FR1 to FR4, and such image region is defined as a correction unit in the correcting part 205. Hereinafter, such image region will be called "a correction unit image region UI". The correction unit image regions UI in the frame images FR1 to FR4 will be called correction unit image regions UI1 to UI4, respectively.

In the present embodiment employing the CMOS sensor 11 in which scanning proceeds in the horizontal line direction X, an image region formed of a plurality of similar block regions located in the same horizontal line direction except the aforementioned moving block region is defined as the correction unit image region UI. When employing a CMOS sensor 11 in which scanning proceeds in the vertical line direction Y, an image region formed of a plurality of similar block regions located in the same vertical line direction except the aforementioned moving block region will be defined as the correction unit image region UI.

After execution of step s5, in step s6, the similar-image detecting part 201 specifies correction unit image regions UI similar to one another among the frame images FR1 to FR4, i.e., correction unit image regions UI1 to UI4 similar to one another. Since hand shake seems to occur uniformly in one horizontal line as described above, similar block regions BL2 which are respectively similar to a plurality of similar block regions BL1 constituting the correction unit image region UI1 in the frame image FR1 are also located in the same horizontal line direction, and those similar block regions BL2 constitute the correction unit image region UI2. Accordingly, the correction unit image region UI2 formed of the similar block regions BL2 which are respectively similar to the plurality of similar block regions BL1 constituting the correction unit image region UI1 is expected to be similar to the correction unit image region UI1.

Similarly, the correction unit image region UI3 formed of similar block regions BL3 which are respectively similar to the plurality of similar block regions BL1 constituting the correction unit image region UI1 is expected to be similar to the correction unit image region UI1. The correction unit image region UI4 formed of similar block regions BL4 which are respectively similar to the plurality of similar block regions BL1 constituting the correction unit image region UI1 is expected to be similar to the correction unit image region UI1. From such viewpoint, the correction unit image regions UI1 to UI4 similar to one another are specified.

Figure 15A:
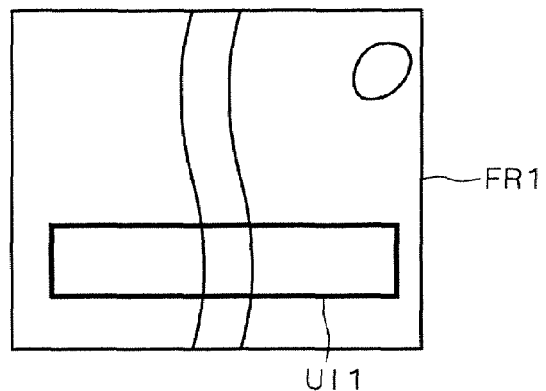
FIGS. 15A to 15D show correction unit image regions similar to one another among the plurality of frame images.
Figure 15B:
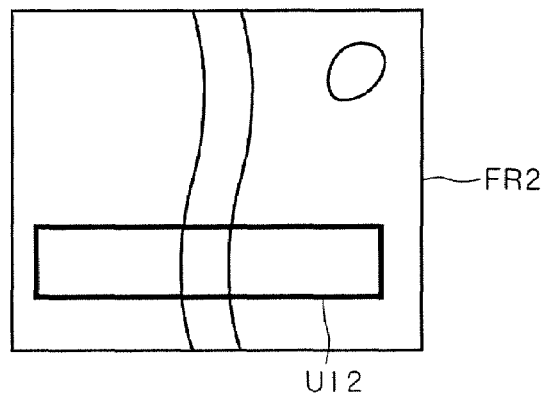
Figure 15C:
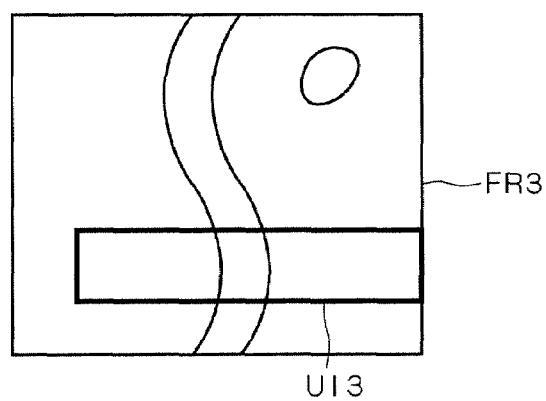
Figure 15D:
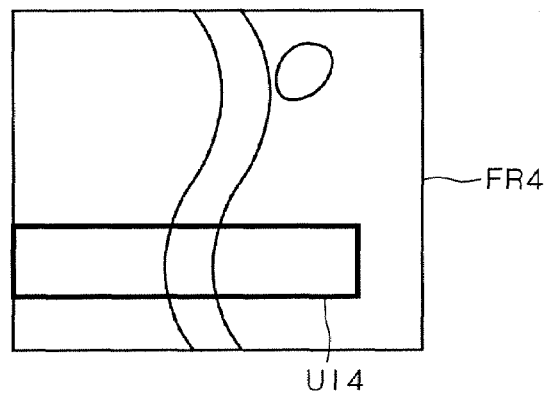

FIGS. 15A to 15D show a set of correction unit image regions UI1 to UI4 similar to one another. FIG. 15A shows a correction unit image region UI1 in the reference frame image FR1, and FIGS. 15B to 15D show correction unit image regions UI2 to UI4 similar to that correction unit image region UI1, respectively. In the present embodiment, since user's hand shake is assumed to occur in the horizontal line direction X when capturing each of the frame images FR1 to FR4, the correction unit image regions UI1 to UI4 similar to one another are located in a horizontal line at the same position in the respective frame images, as shown in FIGS. 15A to 15D.

Next, in step s7, the displacement-vector detecting part 202 detects a displacement vector of the correction unit image region UI with respect to a reference position. That is, it is detected how far the correction unit image region UI is displaced from the reference position. In the present embodiment, the displacement vector of each of a plurality of similar regions constituting the correction unit image region UI is detected, and an average of obtained displacement vectors is defined as a displacement vector of the correction unit image region UI. Processing in step s7 will be described below in detail.

First, the displacement-vector detecting part 202 detects the displacement vector of each of the similar block regions BL1 to BL4 similar to one another with respect to the position of arbitrary one of the similar block regions BL1 to BL4, defined as a reference position, in each set of the similar block regions BL1 to BL4. In the present embodiment, the position of the similar block region BL1 is defined as the reference position.

Figure 16:
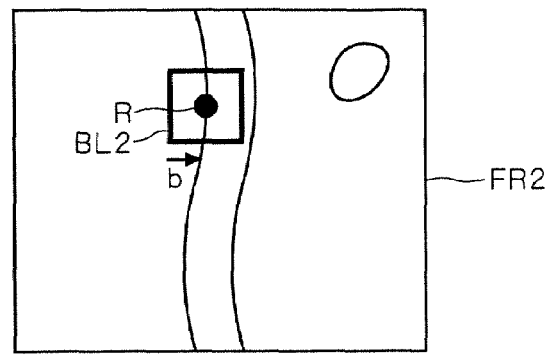
FIGS. 16 to 18 each show a displacement vector of a similar block region.

More specifically, the displacement-vector detecting part 202 detects a displacement vector b of a similar block region BL2 with respect to the position of a similar block region BL1, as shown in FIG. 16, in each pair of similar block regions BL1 and BL2. That is, a vector indicating how far the central pixel R of the similar block region BL2 is displaced from the central pixel R of its corresponding similar block region BL1 is obtained. In the present embodiment, a motion vector between similar block regions BL1 and BL2 is obtained in each pair of similar block regions BL1 and BL2, to be defined as the displacement vector b.

Figure 17:
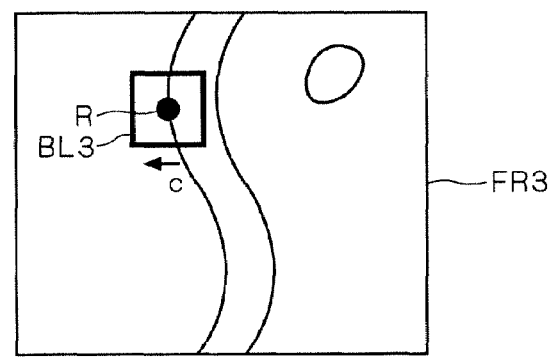
Figure 18:
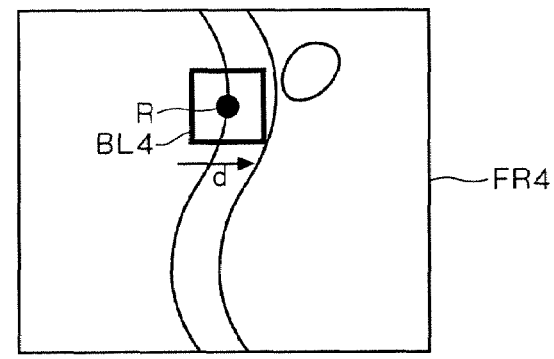
Figure 19A:
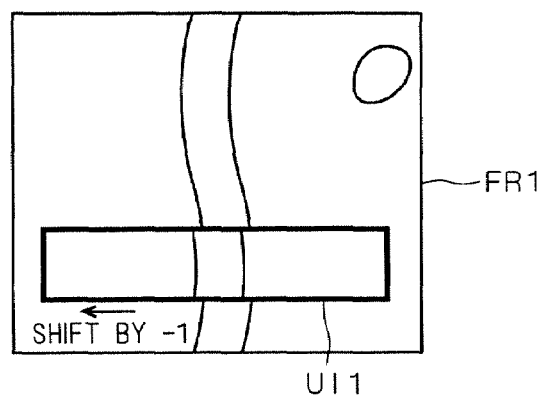
FIGS. 19A to 19D show the method of correcting correction unit image regions according to the first preferred embodiment.
Figure 19B:
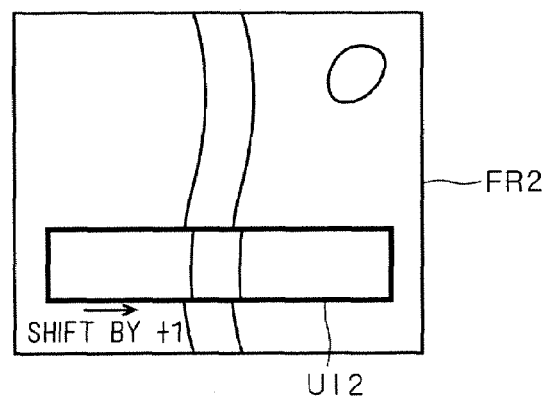
Figure 19C:
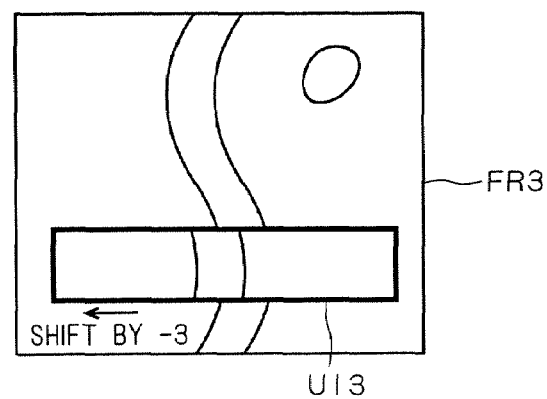
Figure 19D:
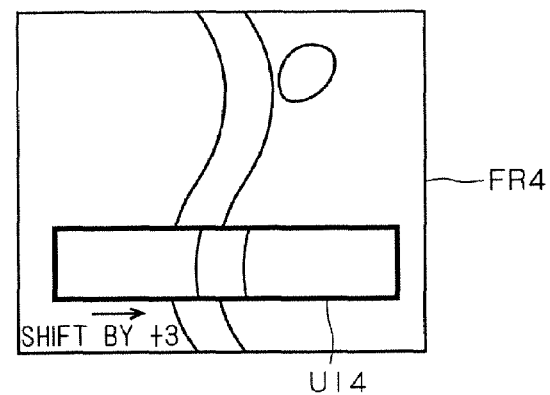

Similarly, a displacement vector c of a similar block region BL3 with respect to the position of its corresponding similar block region BL1 is obtained, as shown in FIG. 17, in each pair of similar block regions BL1 and BL3. A displacement vector d of a similar block region BL4 with respect to the position of its corresponding similar block region BL1 is obtained, as shown in FIG. 18, in each pair of similar block regions BL1 and BL4. In the present embodiment, since the position of the similar block region BL1 is defined as the reference position, a displacement vector a of the similar block region BL1 with respect to the reference position is zero.

Next, the displacement-vector detecting part 202 calculates an average of displacement vectors b of a plurality of similar block regions BL2 constituting each correction unit image region UI2 in the frame image FR2. The obtained average is defined as a displacement vector B of the correction unit image region UI2. The displacement vector B of the correction unit image region UI2 with respect to the position of its corresponding correction unit image region UI1, defined as a reference position, is thereby calculated in each pair of correction unit image regions UI1 and UI2 similar to each other.

As described above, since exposure is expected to start almost at the same time in one line and that hand shake seems to occur uniformly in one line, displacement vectors b of a plurality of similar block regions BL2 located in the same horizontal line direction constituting the correction unit image region UI2 shall essentially have the same value, but are not necessarily have the same value since the displacement vectors b of the plurality of similar block regions BL2 located in the same horizontal line direction typically contain errors such as calculation errors, which in turn may indicate different values from actual displacement vectors of similar block regions BL2. Therefore, using detected displacement vectors b as-is for the displacement vector B of the correction unit image region UI2 and using the displacement vector B in correcting the frame image FR2 in the correcting part 205 may cause inappropriate correction of the frame image FR2.

In the present embodiment, an average of displacement vectors b of a plurality of similar block regions BL2 constituting the correction unit image region UI2 is calculated and the average is defined as the displacement vector B of the correction unit image region UI2. This reduces an adverse influence upon subsequent correction processing caused by errors contained in displacement vectors b.

Similarly, the displacement-vector detecting part 202 calculates an average of displacement vectors c of a plurality of similar block regions BL3 constituting each correction unit image region UI3 in the frame image FR3. The obtained average is defined as a displacement vector C of the correction unit image region UI3.

Similarly, the displacement-vector detecting part 202 calculates an average of displacement vectors d of a plurality of similar block regions BL4 constituting each correction unit image region UI4 in the frame image FR4. The obtained average is defined as a displacement vector D of the correction unit image region UI4.

In the present embodiment, since the position of the correction unit image region UI1 is defined as the reference position, a displacement vector A of the correction unit image region UI with respect to the reference position is zero. This is so also because displacement vectors a of a plurality of similar block regions BL1 constituting the correction unit image region UI1 are all zero.

Next, in step s8, the average calculating part 203 calculates an average Z of displacement vectors A to D for each set of correction unit image regions UI1 to UI4 similar to one another.

Next, in step s9, the correcting part 205 corrects each of the frame images FR1 to FR4 on the basis of the average Z obtained in step s8. The correcting part 205 further corrects the moving region MVR in each of the frame images FR1 to FR4. Processing in step s9 will be described below in detail.

The correcting part 205 shifts the correction unit image regions UI1 to UI4 similar to one another in the respective frame images such that the respective displacement vectors of the correction unit image regions UI1 to UI4 become equal to the average Z.

For instance, let a displacement vector be indicated by either direction "+" or "−", and be expressed as an integer. Letting original displacement vectors of the correction unit image regions UI1 to UI4 with respect to the reference position be "0", "−2", "+2" and "−4", respectively, then, the average Z is "−1". In this case, the correction unit image regions UI1 to UI4 are shifted by "−1", "+1", "−3" and "+3", respectively, so that the displacement vectors of the correction unit image regions UI1 to UI4 with respect to the reference position become "−1". FIGS. 19A to 19D show this processing.

As described above, since user's hand shake occurs at random in the plurality of frame images FR1 to FR4, the correction unit image regions UI1 to UI4 similar to one another are displaced from their original position at random. Accordingly, the average Z of displacement vectors A to D of the correction unit image regions UI1 to UI4 with respect to the reference position becomes close to the displacement vector of the original position of correction unit image regions UI1 to UI4 with respect to the reference position. Therefore, the correction unit image regions UI1 to UI4 are shifted such that the displacement vectors of the correction unit image regions UI1 to UI4 with respect to the reference position become the average Z, so that the correction unit image regions UI1 to UI4 can be brought close to their original position.

At this time, not only the correction unit image region UI1 but also all other block regions BL1 located in the same horizontal line direction as the similar block regions BL1 constituting the correction unit image region UI1 are shifted. That is, an image region formed of block regions BL1 located in the same horizontal line direction including the correction unit image region UI1, i.e., an image region formed of 5×M pixels including the correction unit image region UI1 is shifted. This is because an image distortion similar to that in the correction unit image region UI1 also seems to occur in image regions in the plurality of block regions BL1 located in the same horizontal line direction excluding the correction unit image region UI1, since exposure is expected to start almost at the same time and hand shake seems to occur uniformly in one line.

Similarly, when shifting the correction unit image regions UI2 to UI4, all other block regions BL2 located in the same horizontal line as similar block regions BL2 constituting the correction unit image region UI2, all other block regions BL3 located in the same horizontal line as similar block regions BL3 constituting the correction unit image region UI3, and all other block regions BL4 located in the same horizontal line as similar block regions BL4 constituting the correction unit image region UI4 are also shifted.

The above processing is carried out for each set of correction unit image regions UI1 to UI4 similar to one another to correct each of the frame images FR1 to FR4. The corrected frame images FR1 to FR4 are shown in FIGS. 20A to 20D, respectively. As shown in FIGS. 20A to 20D, the image of the pole having had a distortion in the horizontal line direction X is corrected appropriately in each of the frame images FR1 to FR4 and is straightened. The moving region MVR is hatched in each of FIGS. 20A to 20D.

After shifting the image region formed of block regions BL1 located in the same horizontal line direction including the correction unit image region UI1, an image signal of that image region is used instead of an image signal of an image region present at the destination of shift. The frame image FR1 contains a plurality of image regions 300 each formed of block regions BL1 located in one horizontal line including the correction unit image region UI1, as shown in FIG. 21. Regarding pixel signals of pixels in overlapping portions of these image regions 300 having been shifted, an average of pixel signals of the plurality of image regions 300 is used instead of pixel signals of pixels present at the destination of shift. After shifting an image region formed of block regions BL1 located in one horizontal line including the correction unit image region UI1 in the frame image FR1, part of the image region extending off the frame image FR1 is not used but abandoned. The same applies to the frame images FR2 to FR4.

Next, the correcting part 205 corrects the moving region MVR in any one of the frame images FR1 to FR4 shown in FIG. 20A to 20D. FIG. 22 shows the method of correcting the moving region MVR. In FIG. 22, the moving region MVR yet to be corrected is indicated by solid line, and the moving region MVR having been corrected is indicated by broken lines. In the present embodiment, the moving region MVR in the frame image FR4 shall be corrected.

The correcting part 205 corrects the moving region MVR on the basis of the motion vector of the moving region MVR obtained in step s5, image-capturing-time-interval information, exposure-starting-time-difference information and exposure-start-sequence information. Here, the image-capturing-time-interval information relates to the image-capturing time interval in a set of a plurality of frame images, and in the present embodiment, contains information on an image-capturing time interval td1 between two frame images consecutively captured among the plurality of frame images FR1 to FR4. The image-capturing time interval td1 is constant among the frame images FR1 to FR4. The exposure-starting-time-difference information relates to the difference in exposure starting time resulting from the difference in position in one frame image caused by the rolling shutter type exposure, and in the present embodiment, contains information on the aforementioned time difference std in exposure starting time between pixels. The exposure-start-sequence information relates to the exposure start sequence in one frame image captured by the rolling shutter type exposure, i.e., information indicating the sequence in which exposures are made at a plurality of pixel positions in one frame image captured by the rolling shutter type exposure. In a frame image captured by the CMOS sensor 11 according to the present embodiment, exposure is started sequentially from the 1st to M-th columns in a certain row, and when exposure in the M-th column in the certain row is finished, exposure is started at the 1st column in the next row. The information on the exposure start sequence is contained in this exposure-start-sequence information according to the present embodiment. The image-capturing-time-interval information, exposure-starting-time-difference information and exposure-start-sequence information are previously stored in the memory 23. Hereinafter, the method of correcting the moving region MVR will be described in detail.

First, an arbitrary frame image is selected from the frame images FR1 to FR3, other than the frame image FR4. In the present embodiment, the frame image FR1 shall be selected. Next, a moving direction md and moving distance df of the moving region MVR between the frame images FR1 and FR4 are obtained on the basis of the motion vector of the moving region MVR between the frame images FR1 and FR4. More specifically, defining the direction pointed by the motion vector of the moving region MVR between the frame images FR1 and FR4 as the moving direction md, the absolute value of that motion vector is obtained as the moving distance df. That is, the motion vector amount mva is equal to the moving distance df. Further, a moving speed mv of the moving region MVR between the frame images FR1 and FR4 is obtained on the basis of the obtained moving distance df and the image-capturing time interval td1 obtained from the image-capturing time interval information. Letting the speed of the car be constant among the frame images FR1 to FR4, the moving speed mv is expressed as:

$$mv = df/(3 \times td1).$$

Next, as shown in FIG. 22, the respective pixels in the moving region MVR are shifted by the correction amount dr in the opposite direction rmd to the moving direction md, to be employed instead of pixels located at the destination of shift. That is, the respective pixels in the moving region MVR are shifted in the opposite direction rmd to the moving direction md by the correction amount dr, so that pixel signals of the respective pixels are employed instead of pixel signals of the pixels located at the destination of shift. The correction amount dr in this example is a value that varies according to the position of horizontal line. Hereinafter, this correction amount dr will be described.

In the CMOS sensor 11 according to the present embodiment, the exposure starting time varies between pixel positions, as described above. The ball moves between the exposure starting time in a pixel position where exposure is initially started in the moving region MVR (which will hereinafter be called "a reference pixel position") and the exposure starting time in another pixel position in the moving region MVR. This means that shifting a to-be-corrected pixel in the opposite direction to the moving direction of the ball by the distance in which the ball has moved between the exposure starting time in the reference pixel position and the exposure starting time in the pixel position where the to-be-corrected pixel is located can place the to-be-corrected pixel to its original position.

On the other hand, exposure is expected to start almost at the same time in one horizontal line as described above, although, strictly saying, the exposure starting time varies between pixel positions. Therefore, the exposure starting time can be assumed to vary between horizontal lines.

Accordingly, in the present embodiment, the moving region MVR shall be corrected on a horizontal-line-by-horizontal-line basis, and the correction amount dr is expressed by the following equation (2):

$$dr = mv \times p \times std \qquad (2)$$

In the equation (2), p is a value indicating where, in the sequence of exposures, the earliest exposure in the moving region MVR in a horizontal line to which to-be-corrected pixels belong starts, starting from the exposure at the aforementioned reference pixel position, which can be obtained from the exposure-starting-sequence information. For instance, in the case where M=1024 and one horizontal line contains 1024 pixels, let the reference pixel position be in the 2nd row and 2nd column, and, in the moving region MVR, the earliest exposure in a horizontal line to which a to-be-corrected (3, 10)th pixel belongs be performed on the (3, 2)th pixel. Then, p=1024. Since the value of p is constant between a plurality of pixels in one horizontal line, the correction amount dr is constant between the plurality of pixels in one horizontal line. The correction amount dr for a plurality of pixels in the horizontal line to which the pixel in the reference pixel position in the moving region MVR belongs shall be 0 by substituting 0 for p.

As described, shifting the respective pixels in the moving region MVR in the opposite direction rmd to the moving direction md by the correction amount dr can correct an image distortion resulting from the rolling shutter type exposure appearing in the moving region MVR. FIG. 23 shows the frame image FR4 in which the moving region MVR has been corrected (which will hereinafter be called "a corrected frame image FR4C").

In the corrected frame image FR4C, pixel signals in a region where the moving region MVR has originally been located are unnecessary information after the correction of the moving region MVR, and therefore may have arbitrary values. Hereinafter, the region where the moving region MVR has originally been located in the corrected frame image FR4C will be called "an image-lost region ILR". The image-lost region ILR is indicated by alternate long and short dashed lines in FIG. 23.

Figure 20A:
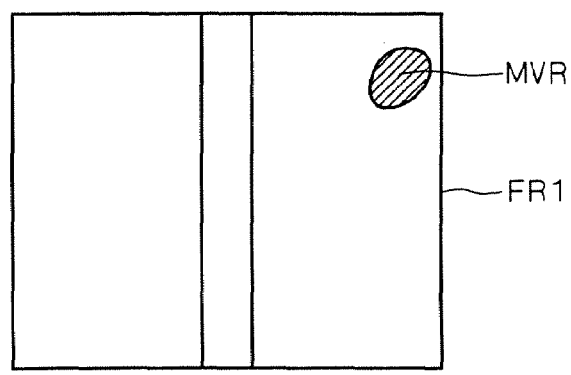
FIGS. 20A to 20D show the frame images with correction unit image regions having been corrected.
Figure 20B:
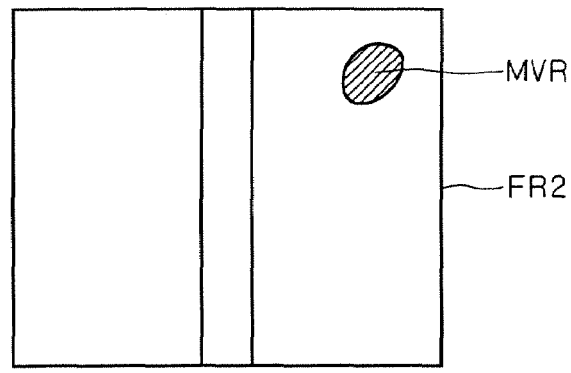
Figure 20C:
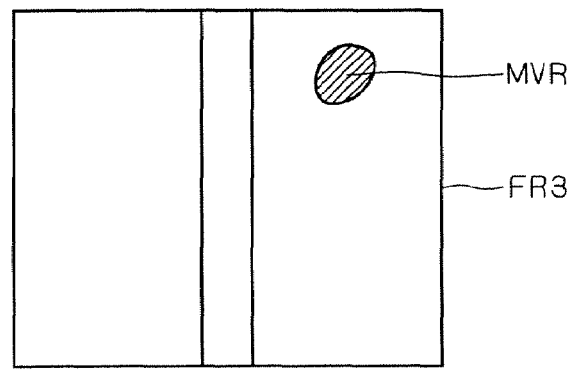
Figure 20D:
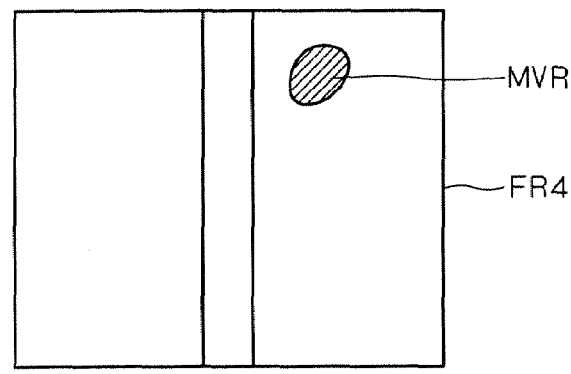

Next, in step s10, the frame-image generating part 206 generates a composite frame image CFR corresponding to a frame image captured during the total exposure time period on the basis of the corrected frame image FR4C and the rest of the frame images FR1 to FR3 shown in FIGS. 20A to 20C, respectively. Then, in step s11, the display device 3 displays the composite frame image CFR generated in step s10. Hereinafter, the method of generating the composite frame image CFR will be described in detail.

First, each pixel signal in an image region in the corrected frame image FR4C except the image-lost region ILR, each pixel signal in an image region of the frame image FR1 except an image region located in the same position as the moving region MVR in the corrected frame image FR4C and the moving region MVR, each pixel signal in an image region of the frame image FR2 except an image region located in the same position as the moving region MVR in the corrected frame image FR4C and the moving region MVR, and each pixel signal in an image region of the frame image FR3 except an image region located in the same position as the moving region MVR in the corrected frame image FR4C and the moving region MVR are combined to one another in the same pixel position to superimpose these image regions one upon another. A frame image thus obtained will hereinafter be called "an intermediate frame image MFR".

Next, the exposure amount for the intermediate frame image MFR is controlled. As described above, the corrected frame image FR4C except the image-lost region ILR and the frame images FR1 to FR3 except image regions located in the same position as the moving region MVR in the corrected frame image FR4C and the moving region MVR are superimposed one upon another to generate the intermediate frame image MFR. Therefore, the intermediate frame image MFR includes an image region where pixel signals for four frames are not combined together.

For instance, in the intermediate frame image MFR, an image region located in the same position as the moving region MVR in the corrected frame image FR4C is composed only of the moving region MVR in the corrected frame image FR4C. Accordingly, each pixel signal of that image region in the intermediate frame image MFR is composed only of a pixel signal for one frame. Besides, in the intermediate frame image MFR, neither image region in the corrected frame image FR4C is used in an image region located in the same position as the image-lost region ILR in the corrected frame image FR4C. Accordingly, each pixel signal of that image region in the intermediate frame image MFR is composed only of pixel signal/signals for one, two or three frames. Therefore, the intermediate frame image MFR should be corrected such that all the pixel signals in the intermediate frame image MFR are each composed of pixel signals for four frames. Hereinafter, this correction method will be described in detail.

Figure 24:
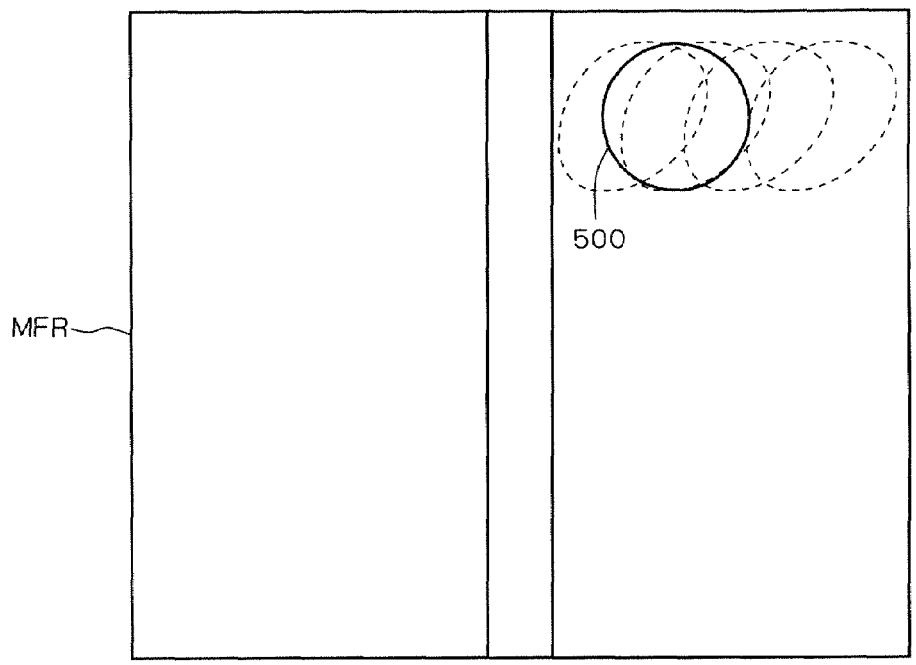
FIGS. 24 through 27 show the method of correcting an intermediate frame image according to the first preferred embodiment.

As shown in FIG. 24, in the intermediate frame image MFR, giving attention to an image region 500 located in the same position as the moving region MVR in the corrected frame image FR4C, images of the moving regions MVR in the frame images FR1 to FR3 are superimposed upon the image region 500. Specifically, since an image distortion resulting from the rolling shutter type exposure appearing in the moving regions MVR in the frame images FR1 to FR3 has not been corrected, the respective moving regions MVR in the frame images FR1 to FR3 are different in shape from the image region 500 in the intermediate frame image MFR. Accordingly, the correcting part 205 makes a correction of shifting pixels in each of the moving regions MVR in the frame images FR1 to FR3 in the opposite direction rmd to the moving direction md by the correction amount dr, to thereby correct the image distortion resulting from the rolling shutter type exposure appearing in each of the moving regions MVR in the frame images FR1 to FR3. Then, the frame-image generating part 206 superimposes the respective corrected moving regions MVR in the frame images FR1 to FR3 upon the image region 500 in the intermediate frame image MFR. More specifically, each pixel signal in the image region 500 in the intermediate frame image MFR, each pixel signal in the corrected moving region MVR in the frame image FR1, each pixel signal in the corrected moving region MVR in the frame image FR2 and each pixel signal in the corrected moving region MVR in the frame image FR3 are combined in the same pixel position. Accordingly, the image region 500 in the intermediate frame image MFR is generated using the moving region MVR in the corrected frame image FR4C and moving regions MVR in the frame images FR1 to FR3, whereby each pixel signal in the image region 500 in the intermediate frame image MFR is composed of pixel signals for four frames. Generating the image region 500 by superimposing image regions one upon another in a plurality of frame images allows reduction in random noise appearing in image signals at image capturing. In the intermediate frame image MFR shown in FIG. 24 and FIGS. 25 to 27 which will be referred to later, an image region located in the same position as the moving region MVR yet to be corrected in the frame image FR4 shown in FIG. 20D and image regions located in the same position as the moving regions MVR in the frame images FR1 to FR3 are indicated by broken lines, respectively, for ease of description.

Further, as described above, in the intermediate frame image MFR, since each pixel signal in an image region located in the same position as the image-lost region ILR in the corrected frame image FR4C is composed only of pixel signal/signals for one, two or three frames, each pixel signal in that image region is multiplied by L/K to be composed of pixel signals for four frames. Here, K is a value indicating how many frames a pixel signal of a to-be-corrected pixel covers.

Figure 25:
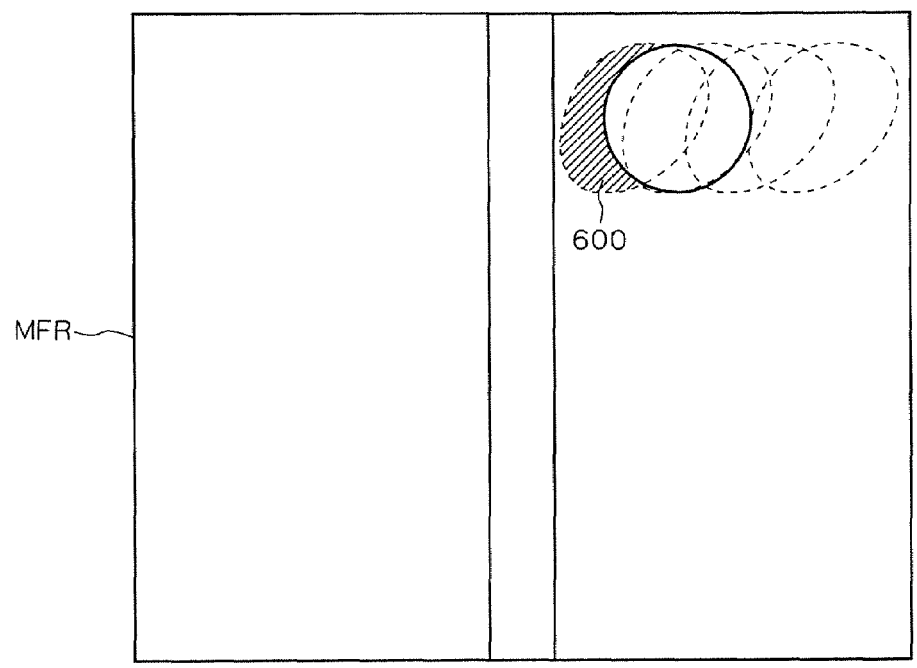

For instance, as shown in FIG. 25, in the intermediate frame image MFR according to the present embodiment, since an image region 600 located in the same position as the image-lost region ILR in the corrected frame image FR4C is formed by superimposing thereupon image regions in the frame images FR1 to FR3 located in the same position as the region 600, which means K=3. Each pixel signal in the image region 600 is multiplied by 4/3, since L=4 in this example. Accordingly, each pixel signal in the image region 600 is composed of pixel signals for four frames.

Figure 26:
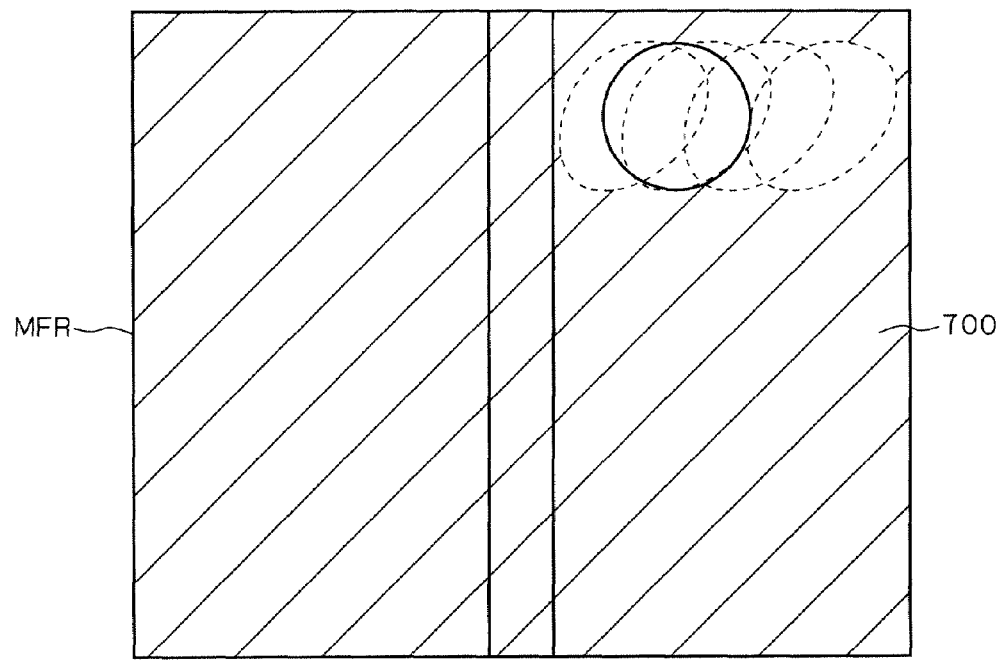
Figure 27:
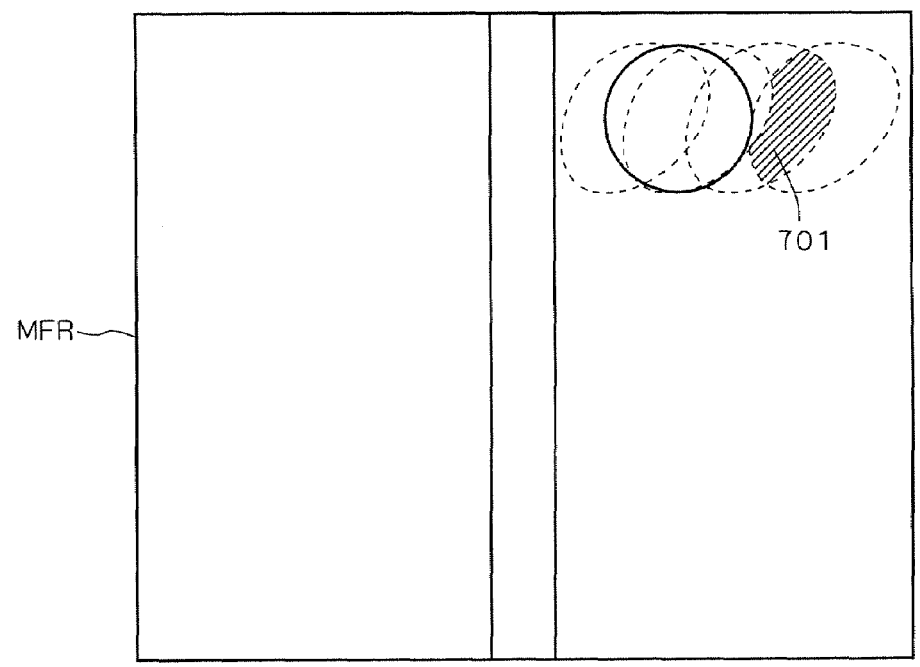

Furthermore, in the intermediate frame image MFR, since each pixel signal of an image region other than the aforementioned image regions 500 and 600 is composed of pixel signal/signals for one, two, three or four frames, each pixel signal of that image region is also multiplied by L/K. For instance, as shown in FIG. 26, a hatched image region 700 in the intermediate frame image MFR is formed by superimposing thereupon image regions in the corrected frame image FR4C and the frame images FR1 to FR3 located in the same position as the region 700, which means K=4. Accordingly, each pixel signal in the region 700 is multiplied by 4/4, which is not changed. On the other hand, as shown in FIG. 27, a hatched region 701 in the intermediate frame image MFR is formed only by an image region located in the same position as the region 701 in the corrected frame image FR4C, which means K=2. Accordingly, each pixel signal in the region 701 is multiplied by 4/2, i.e., doubled.

Figure 28:
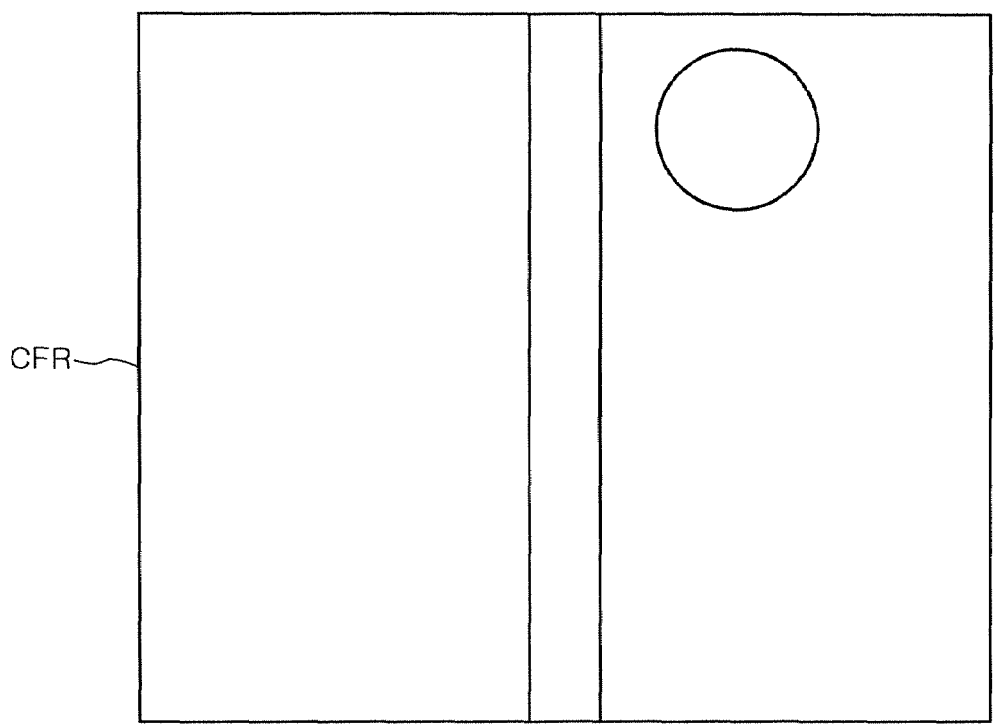
FIG. 28 shows a composite frame image according to the first preferred embodiment.

The intermediate frame image MFR is thus corrected, and the corrected intermediate frame image MFR is defined as the composite frame image CFR. FIG. 28 shows the composite frame image CFR according to the present embodiment.

When the composite frame image CFR is generated in step s10, the composite image signal CDIS indicating its digital image signal DIS is stored in the memory 23. The RPU 21 reads out the composite image signal CDIS from the memory 23, and carries out various kinds of filtering such as sharpening on the composite image signal CDIS. Then, in step s11, the composite image signal CDIS having undergone the filtering is inputted to the display device 3, and the display device 3 displays an image on the basis of the composite image signal CDIS. The composite frame image CFR is thereby displayed as a stationary image.

While the above example has been addressed to the method of correcting frame images when capturing an image of a subject moving in the horizontal line X of image screen, the rolling shutter effect can be corrected similarly when capturing an image of a subject moving in the vertical line Y of image screen.

As described, the image processor 2 according to the present embodiment calculates the average Z of displacement vectors A to D in the correction unit image regions UI1 to UI4 similar to one another, and shifts the respective correction unit image regions UI1 to UI4 such that the respective displacement vectors of the correction unit image regions UI1 to UI4 become the average Z, so that the correction unit image regions UI1 to UI4 can be brought close to their original position. This in result can reduce an image distortion resulting from the rolling shutter type exposure.

According to the present embodiment, an average of displacement vectors a of a plurality of similar block regions BL1 constituting the correction unit image region UI1 is defined as the displacement vector A of the correction unit image region UI1. This reliably reduces an influence upon the correction processing caused by errors contained in displacement vectors a. Accordingly, an image distortion resulting from the rolling shutter type exposure can be reduced reliably.

According to the present embodiment, the composite frame image CFR corresponding to a frame image captured during the total exposure time period is generated on the basis of the plurality of frame images FR1 to FR4 captured during short divided exposure time periods. This can reduce random noise occurring in image signals at image capturing.

According to the present embodiment, the moving region MVR in the frame image FR4 to be corrected is corrected on the basis of the motion vector of the detected moving region MVR, image-capturing time interval information, exposure-starting-time-difference information and exposure-start-sequence information, which achieves appropriate correction of an image distortion appearing in that moving region MVR caused by the rolling shutter type exposure. This in result can reduce an image distortion in the frame image FR4.

In the composite frame image CFR generated by the frame-image generating part 206, the image region 600 located in the same position as the image-lost region ILR in the corrected frame image FR4C is generated on the basis of the remaining frame images FR1 to FR3 other than the corrected frame image FR4C. The image region 600 is thus generated with high fidelity to the subject.

In the composite frame image CFR, the image region 500 located in the same position as the moving region MVR in the corrected frame image FR4C is generated on the basis of the moving region MVR in the corrected frame image FR4C and moving regions MVR in the remaining frame images FR1 to FR3. The image region 500 is thus generated with high fidelity to the subject. This in result allows an image of a moving subject to be generated with high fidelity to the actual subject in the composite frame image CFR.

In the composite frame image CFR, image regions excluding the image region 600 located in the same position as the image-lost region ILR in the corrected frame image FR4C and the image region 500 located in the same position as the moving region MVR in the corrected frame image FR4C are generated on the basis of image regions other than the moving regions MVR located in the same position to one another in the corrected frame image FR4C and remaining frame images FR1 to FR3. This allows image regions other than the image regions 500 and 600 in the composite frame image CFR, such as the hatched regions 700, 701 and the like, to be generated with high fidelity to the subject.

Second Preferred Embodiment

Figure 29:
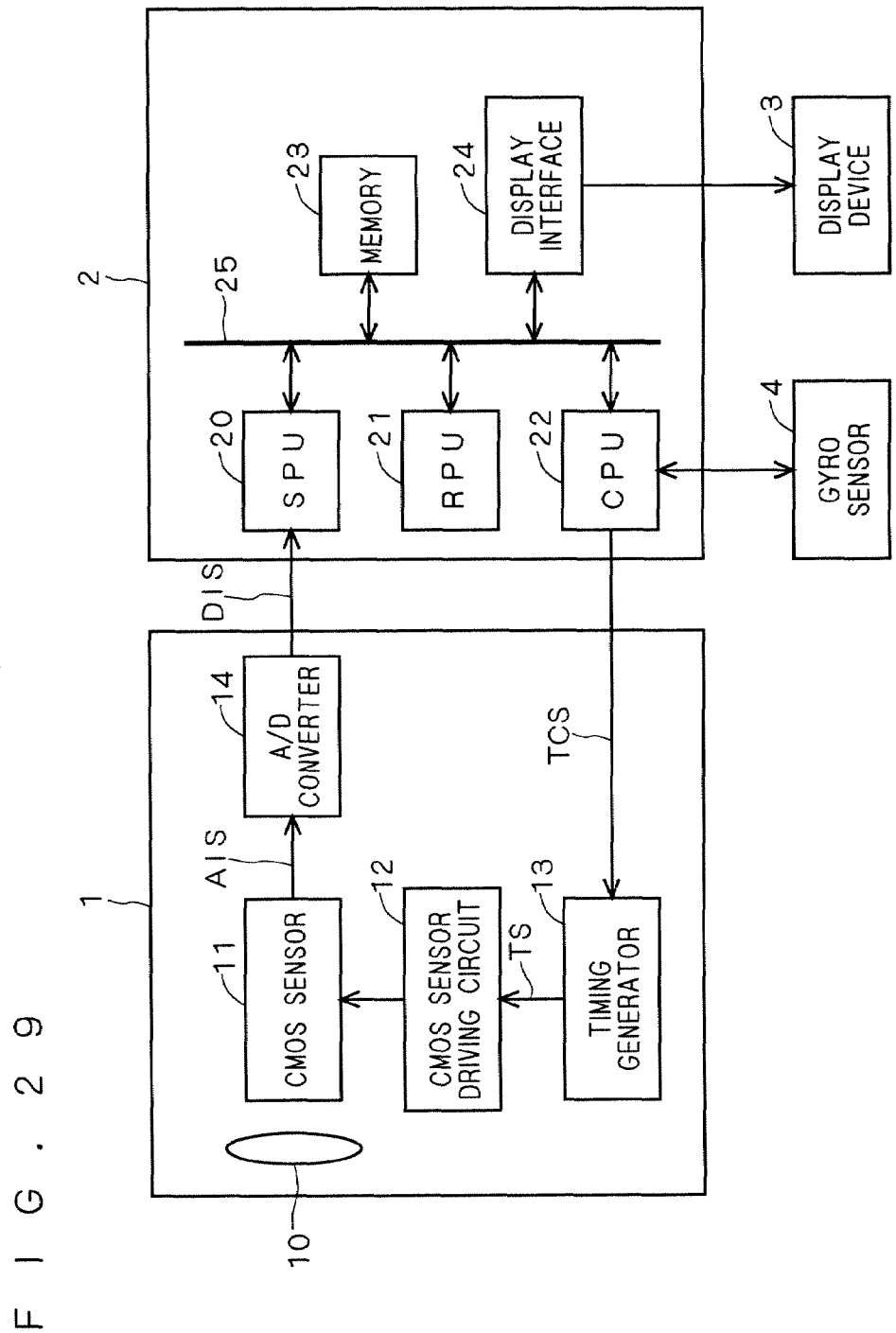
FIG. 29 is a block diagram showing the configuration of a camera system according to a second preferred embodiment of the invention.

FIG. 29 is a block diagram showing the configuration of a camera system according to a second preferred embodiment of the invention. The camera system according to the second preferred embodiment additionally includes a gyro sensor 4 in the camera system according to the first preferred embodiment.

Hand shake generally occurs at random in a plurality of frame images as described above, but may appear in agreement among a plurality of frame images in some rare cases. FIGS. 30A to 30D show such case. As shown, when hand shake appears in agreement among the frame images FR1 to FR4, these images are the same image except an image of a moving subject. Accordingly, the aforementioned displacement vectors a to d all become zero, in which case an image distortion resulting from the hand shake and rolling shutter type exposure cannot be corrected.

According to the present embodiment, the gyro sensor 4 detects the amount of shake of the present camera system, and corrects each of the frame images FR1 to FR4 on the basis of the amount of shake, to thereby correct an image distortion resulting from the rolling shutter type exposure to some extent even when hand shake appears in agreement among the frame images FR1 to FR4.

The gyro sensor 4 detects the amount of shake of the present camera system when capturing frame images with the image capturing apparatus 1 by operation control performed by the CPU 22. More specifically, with reference to a position of the present camera system when capturing the leading pixel in the first horizontal line in a frame image, the gyro sensor 4 detects and outputs the amount of shake of the present camera system every time the leading pixel in each subsequent horizontal line is captured.

The correcting part 205 according to the present embodiment corrects the respective frame images FR1 to FR4 on the basis of the amount of shake of the present camera system outputted from the gyro sensor 4 before correcting the frame images FR1 to FR4 on the basis of the average Z calculated in the average calculating part 203.

Figure 31A:
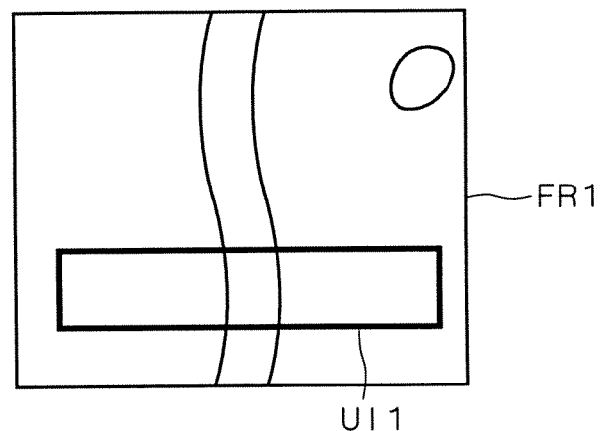
FIGS. 31A and 31B show the method of correcting a correction unit image region according to the second preferred embodiment.
Figure 31B:
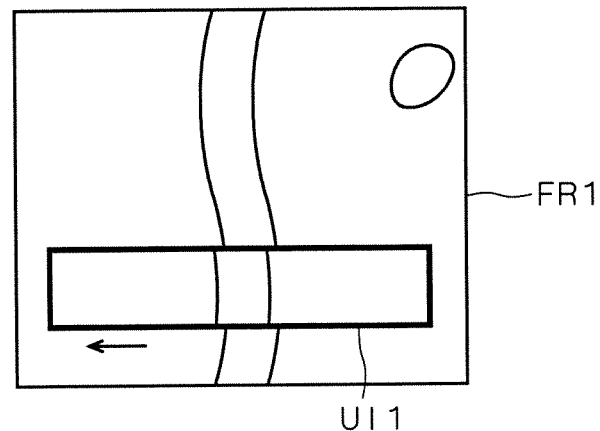

The correcting part 205 shifts each correction unit image region UI1 in the frame image FR1 by the amount of shake in the opposite direction to the direction of shake of the present camera system when capturing the correction unit image region UI1. More specifically, each correction unit image region UI1 is shifted by the amount of shake in the opposite direction to the direction of shake of the present camera system when capturing the leading pixel in a horizontal line in which central pixels R of a plurality of similar block regions BL1 constituting the correction unit image region UI1 are located. FIGS. 31A and 31B show such processing. FIG. 31A shows the frame image FR1 yet to be corrected, and FIG. 31B shows the frame image FR1 having been corrected.

At this time, the correcting part 205 shifts not only the correction unit image region UI1 but also all other block regions BL1 located in the same horizontal line direction as the similar block regions BL1 constituting the correction unit image region UI1, similarly to the case of correcting the correction unit image region UI1 on the basis of the average Z. In other words, an image region formed of block regions BL1 located in one horizontal line containing the correction unit image region UI1 is shifted by the amount of shake in the opposite direction to the direction of shake of the present camera system. The correcting part 205 carries out similar correction processing on each of the frame images FR2 to FR4.

After correction of the frame images FR1 to FR4 on the basis of the amount of shake of the present camera system, the correcting part 205 corrects the frame images FR1 to FR4 on the basis of the average Z obtained by the average calculating part 203. Other operation of the present camera system is similar to that described in the first preferred embodiment, and repeated explanation is thus omitted here.

As described above, the camera system according to the present embodiment corrects the frame images FR1 to FR4 on the basis of the amount of shake of the present camera system detected by the gyro sensor 4, and therefore can correct an image distortion resulting from the rolling shutter type exposure even when hand shake appears in agreement among the frame images FR1 to FR4.

While the first and second preferred embodiments have been addressed to the camera system for displaying a stationary image, a motion picture can be displayed on the display device 3 on the basis of a plurality of composite frame images CFR generated by the frame-image generating part 206, which means the present invention is applicable to not only a digital still camera but also a digital video camera for displaying a motion picture. For instance, 4×15 frame images are sequentially captured. Of these captured frame images, defining sequentially-captured four frame images as a set of frame images, one composite frame image CFR is generated from each of fifteen sets of frame images. Sequentially displaying the fifteen composite frame images CFR thus generated in one second achieves motion picture display at a frame rate of 15 fps (frame/sec).

Displaying a motion picture on the basis of a plurality of composite frame images CFR as described above allows the motion picture to be displayed on the basis of frame images in which image distortions resulting from the rolling shutter type exposure have been corrected. This can provide a user with a motion picture that is easy to see, which is advantageous because an image distortion resulting from the rolling shutter type exposure particularly in a motion picture gives great discomfort on a user.

Figure 32:
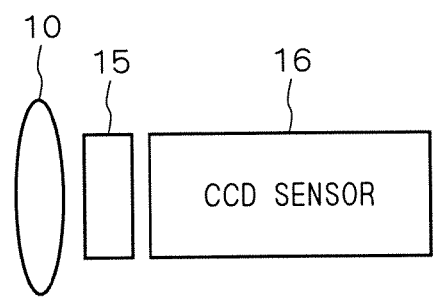
FIG. 32 is a block diagram showing a modification of the image capturing apparatus according to the first and second preferred embodiments.

Further, as shown in FIG. 32, replacing the CMOS sensor 11 in the image capturing apparatus 1 with a rolling shutter 15 which is a mechanical shutter and a CCD sensor 16 also causes the rolling shutter effect in frame images similarly when using the CMOS sensor 11 only. The present invention is also applicable to such image capturing apparatus 1.

Generally, in the image capturing apparatus 1 including the rolling shutter 15 and CCD sensor 16, a horizontally long slit moves from top to bottom in front of an image-capturing screen of the CCD sensor 16 by the operation of the rolling shutter 15, thereby performing an exposure using light entering through the slit. Accordingly, the exposure starting time is the same in one line in one frame image, but varies between lines. Therefore, when using such image capturing apparatus 1, the aforementioned correction amount dr is set at mv×q×std1, unlike in the above example, where std1 denotes the time difference in exposure starting time between lines, and q is a value indicating where in the sequence of exposures an exposure at a line to which to-be-corrected pixels in the moving region MVR belong starts, starting from the line where the earliest exposure is performed in the moving region MVR. Therefore, in this case, the correction amount dr for a plurality of pixels in one line is constant, and the correction amount dr for pixels belonging to the line where the earliest exposure is performed in the moving region MVR is zero. Further, the exposure-starting-time-difference information contains information on the time difference std1 in exposure starting time between lines, and exposure-start-sequence information contains information on exposure start sequence indicating exposure is performed in the order from the 1st row to the N-th row.

While the invention has been shown and described in detail, the foregoing description is in all aspects illustrative and not restrictive. It is therefore understood that numerous modifications and variations can be devised without departing from the scope of the invention.

What is claimed is:

1. An image processor comprising:
 a similar-image detecting part configured to detect a similar image region in each of a plurality of frame images captured by rolling shutter type exposure, said similar image region being similar among said plurality of frame images;
 a displacement-vector detecting part configured to detect a displacement vector of said similar image region with respect to a common reference position among said plurality of frame images;

an average calculating part configured to calculate an average of displacement vectors in said plurality of frame images; and
a correcting part configured to shift said similar image region in one of said plurality of frame images such that said displacement vector of said similar image region becomes said average.

2. The image processor according to claim 1, wherein
said similar image region is formed of a plurality of partial image regions located in the same line direction in a corresponding one of said plurality of frame images, each of said plurality of partial image regions being similar among said plurality of frame images,
the positions of said plurality of partial image regions in a selected frame image from among said plurality of frame images are defined as reference positions, and
said displacement-vector detecting part detects displacement vectors of said plurality of partial image regions in one remaining frame image of said plurality of frame images with respect to said reference positions, calculates an average of the displacement vectors of said plurality of partial image regions in said one remaining frame image, and takes the average as said displacement vector of said similar image region in said one remaining frame image.

3. A camera system for capturing an image, comprising:
an image capturing apparatus for capturing a plurality of frame images by rolling shutter type exposure;
an image processor; and
a sensor configured to detect the amount of shake of said camera system, wherein
said image processor includes:
a similar-image detecting part configured to detect a similar image region in each of a plurality of frame images captured by rolling shutter type exposure, said similar image region being similar among said plurality of frame images;
a displacement-vector detecting part configured to detect a displacement vector of said similar image region with respect to a common reference position among said plurality of frame images;
an average calculating part configured to calculate an average of displacement vectors in said plurality of frame images; and
a correcting part configured to shift, in one of said plurality of frame images, said similar image region by said amount of shake in a direction opposite to the direction of said shake of said camera system when capturing said similar image region, and then to shift, in said one of said plurality of frame images, said similar image region such that said displacement vector of said similar image region becomes said average.

4. A camera system for capturing an image, comprising:
an image capturing apparatus for capturing a plurality of frame images by rolling shutter type exposure; and
an image processor, wherein
said image processor includes an exposure-time determining part configured to determine an exposure time period in said image capturing apparatus and divide said exposure time period by the same number as the number of said plurality of frame images to obtain divided exposure time periods,
said image capturing apparatus captures each of said plurality of frame images during a corresponding one of said divided exposure time periods,
said image processor further includes:
a similar-image detecting part configured to detect a similar image region in each of said plurality of frame images captured with said image capturing apparatus, said similar image region being similar among said plurality of frame images;
a displacement-vector detecting part configured to detect a displacement vector of said similar image region with respect to a common reference position among said plurality of frame images;
an average calculating part configured to calculate an average of displacement vectors in said plurality of frame images;
a correcting part configured to shift said similar image region in each of said plurality of frame images such that said displacement vector of said similar image region becomes said average; and
a frame-image generating part configured to generate a composite frame image corresponding to a frame image captured during said exposure time period on the basis of said plurality of frame images corrected in said correcting part.

5. The camera system according to claim 4, wherein
said frame-image generating part generates a plurality of composite frame images,
said camera system further comprising
a display device configured to display a motion picture on the basis of said plurality of composite frame images.

6. An image processing method of processing an image captured by rolling shutter type exposure, comprising the steps of:
(a) detecting a similar image region in each of a plurality of frame images captured by rolling shutter type exposure, said similar image region being similar among said plurality of frame images;
(b) detecting a displacement vector of said similar image region with respect to a common reference position among said plurality of frame images;
(c) calculating an average of displacement vectors in said plurality of frame images; and
(d) shifting said similar image region in one of said plurality of frame images such that said displacement vector of said similar image region becomes said average.

7. The image processing method according to claim 6, wherein
said similar image region is formed of a plurality of partial image regions located in the same line direction in a corresponding one of said plurality of frame images, each of said plurality of partial image regions being similar among said plurality of frame images,
the positions of said plurality of partial image regions in a selected frame image from among said plurality of frame images are defined as reference positions, and
said step (b) detects displacement vectors of said plurality of partial image regions in one remaining frame image of said plurality of frame images with respect to said reference positions, calculates an average of the displacement vectors of said plurality of partial image regions in said one remaining frame image, and takes the average as said displacement vector of said similar image region in said one remaining frame image.

8. The image processing method according to claim 6, further comprising the steps of:
(e) detecting the amount of shake of a camera system for capturing said plurality of frame images; and
(f) before said step (d), shifting, in said one of said plurality of frame images, said similar image region by said amount of shake in a direction opposite to the direction of said shake of said camera system when capturing said similar image region detected in said step (e).

9. The image processing method according to claim 6, further comprising the step of:
(e) determining an exposure time period and dividing said exposure time period by the same number as the number of said plurality of frame images to obtain divided exposure time periods, wherein
each of said plurality of frame images is captured during a corresponding one of said divided exposure time periods, and
in said step (d), said similar image region is shifted in each of said plurality of frame images such that said displacement vector of said similar image region becomes said average,
said method further comprising the step of:
(f) generating a composite frame image corresponding to a frame image captured during said exposure time period on the basis of said plurality of frame images corrected in said step (d).

10. A motion picture displaying method, comprising the steps of:
(a) preparing a plurality of composite frame images, each being generated by a predetermined image processing method;
(b) displaying a motion picture on the basis of said plurality of composite frame images, wherein said predetermined image processing method includes the following steps of:
(c) determining an exposure time period and dividing said exposure time period by a predetermined number to obtain divided exposure time periods;
(d) detecting similar image region in each of a plurality of frame images of the same number as said predetermined number, said plurality of frame images each being captured by rolling shutter type exposure during a corresponding one of said divided exposure time periods, said similar image region being similar among said plurality of frame images;
(e) detecting a displacement vector of said similar image region with respect to a common reference position among said plurality of frame images;
(f) calculating an average of displacement vectors in said plurality of frame images; and
(g) shifting said similar image region in each of said plurality of frame images such that said displacement vector of said similar image region becomes said average; and
(h) generating a composite frame image corresponding to a frame image captured during said exposure time period on the basis of said plurality of frame images corrected in said step (g).

\* \* \* \* \*